United States Patent [19]

Hiyoshi et al.

[11] E Patent Number: Re. 32,726

[45] Reissued Date of Patent: Aug. 9, 1988

[54] ENVELOPE GENERATOR

[75] Inventors: Teruo Hiyoshi; Akira Nakada; Shigeru Yamada; Eiichiro Aoki, all of Hamamatsu; Eiichi Yamaga, Tokyo, all of Japan

[73] Assignee: Nippon Gakki Seizo Kabushiki Kaisha, Hamamatsu, Japan

[21] Appl. No.: 154,993

[22] Filed: May 30, 1980

Related U.S. Patent Documents

Reissue of:

[64] Patent No.: 4,185,532
Issued: Jun. 29, 1980
Appl. No.: 837,599
Filed: Sep. 28, 1977

[30] Foreign Application Priority Data

Sep. 29, 1976 [JP] Japan ..... 51-116776

[51] Int. Cl.[4] ..... G10H 1/02

[52] U.S. Cl. ..... 84/1.26; 84/1.13; 364/722

[58] Field of Search ..... 84/1.26, 1.13, 124; 364/722, 718

[56] References Cited

U.S. PATENT DOCUMENTS

| | | | |
|---|---|---|---|
| 3,515,792 | 6/1970 | Deutsch et al. | 84/1.24 |
| 3,610,805 | 10/1971 | Watson et al. | 84/1.13 |
| 3,632,996 | 1/1972 | Paine et al. | 364/722 |
| 3,729,625 | 4/1973 | Inoue | 364/718/ |
| 3,930,144 | 12/1975 | Tanaka | 364/718 |
| 4,079,650 | 3/1978 | Deutsch et al. | 84/1.13 |
| 4,083,285 | 4/1978 | Chibana | 84/1.13 |
| 4,085,644 | 4/1978 | Deutsch et al. | 84/1.01 |
| 4,128,032 | 12/1978 | Wada et al. | 84/1.26 X |

OTHER PUBLICATIONS

In re Constant, 3USPQ 2nd at 1479.

*Primary Examiner*—Forester W. Isen
*Attorney, Agent, or Firm*—Spensley Horn Jubas & Lubitz

[57] ABSTRACT

An envelope generator is provided with a count circuit the count value of which is varied through addition or subtraction or combination thereof, and a conversion circuit which operates to convert the count value into amplitude data, so as to generate an envelope having a shape corresponding to variations with time of the count value. According to one aspect of the invention, the count circuit is a circuit which carries out computation for exponentially varying the count value through polygonal line approximation, so as to form an envelope of exponential characteristic. According to another aspect of the invention, the conversion circuit is a memory which has stored amplitude data corresponding to count values in advance so as to convert count values in the last linear region of the envelope obtained by the polygonal line approximation into amplitude data in exponential relation and to convert count values contained in the remaining polygonal line regions into amplitude data in linear relation.

19 Claims, 9 Drawing Sheets

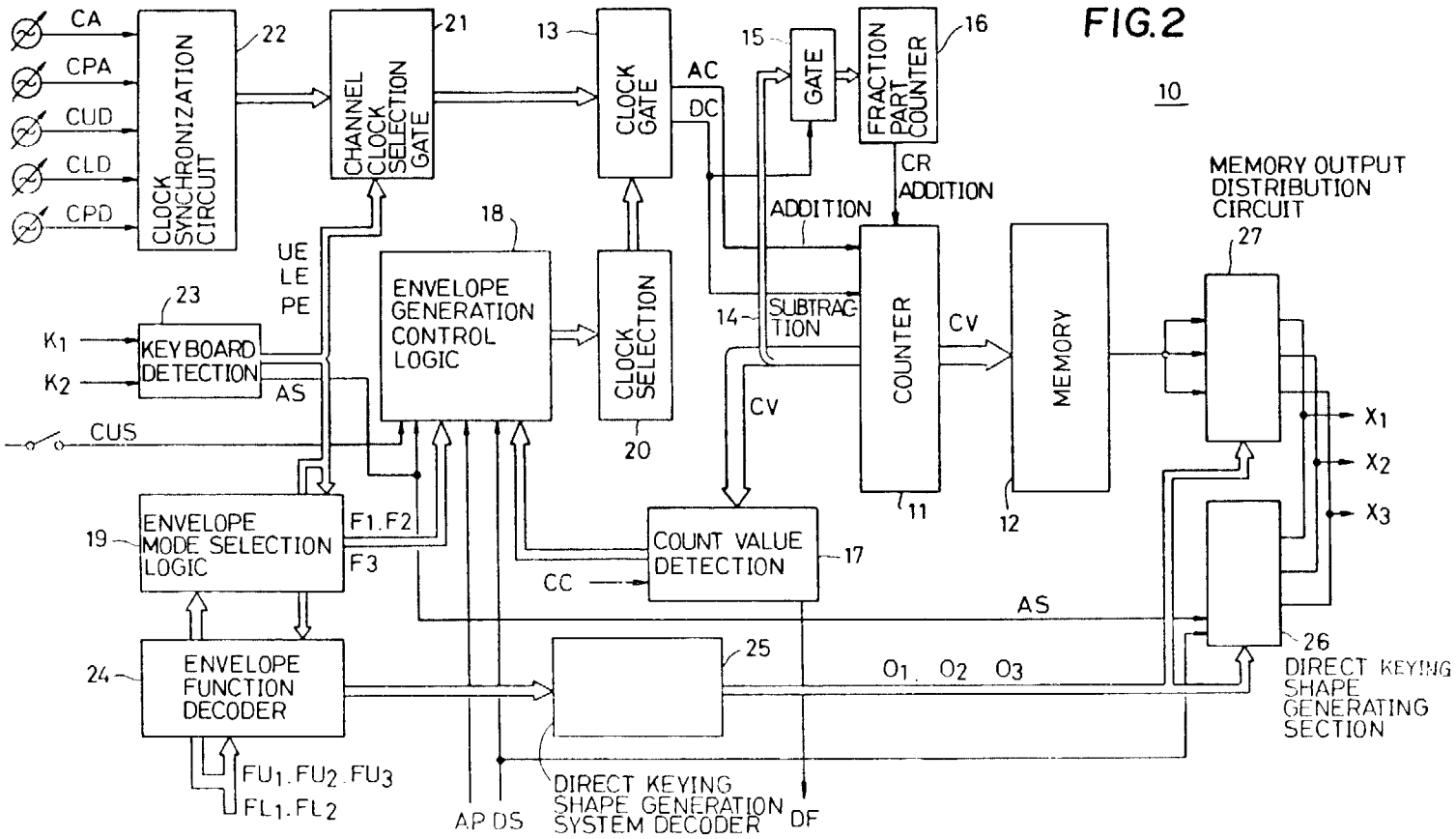
FIG.2
10
MEMORY OUTPUT DISTRIBUTION CIRCUIT
27
X1
X2
X3
26
DIRECT KEYING SHAPE GENERATING SECTION
MEMORY
12
AS
O1
O2
O3
16
FRACTION PART COUNTER
CR
ADDITION
COUNTER
11
CV
GATE
15
ADDITION
SUBTRACTION
14
CV
17
COUNT VALUE DETECTION
25
DIRECT KEYING SHAPE GENERATION SYSTEM DECODER
DF
AC
DC
CLOCK GATE
13
CLOCK SELECTION
20
CC
18
ENVELOPE GENERATION CONTROL LOGIC
AP DS
21
CHANNEL CLOCK SELECTION GATE
UE
LE
PE
AS
F1.F2
F3
ENVELOPE MODE SELECTION LOGIC
19
ENVELOPE FUNCTION DECODER
24
FU1.FU2.FU3
FL1.FL2
22
CLOCK SYNCHRONIZATION CIRCUIT
23
KEYBOARD DETECTION
K1
K2
CUS
CA
CPA
CUD
CLD
CPD S0
AC
DC
S1
CUS'
CV23
CV47
BE
AL1
AS
O1
O2
O3
DS
AL0
DF
AP
DMP
ACP
CUA1
CUD2
DCP
IC
CA2
CA'
CPA2
UD
LD
PD
PE
LE
UE
CA
CPA
CUD
CLD
CPD
K1
K2
CUS
FU1
FU2
FU3
FL1
FL2

ADDITION
SUBTRACTION
IC
SO
AC
DC
S1
BE
AL1
CUS
CV47
CC
CV23
AL0
CV1
CV2
CV3
CV4
CV5
CV6
A CI S
B CO
CR

ADDRESS
0 1 2 3 4 5 6 7 8 9 10 11 12 13 . . . 60 61 62 63
$V_H$ (-5V)
$V_L$ (0V)
$V_M$
$HX_1$ $HX_2$ $HX_3$
$LX_1$ $LX_2$ $LX_3$
$CV_1$ $CV_2$ $CV_3$ $CV_4$ $CV_5$ $CV_6$
AS DS $O_1$ $O_2$ $O_3$
12 26 27 181 182 183 184 185 186 187 188 189 190 191 196 197 198 199 200 201 203 204 205 206 207 208 209 210 211 212 213 214 215 216 217 218 219 220 221 222 223 224 225 226 227 228

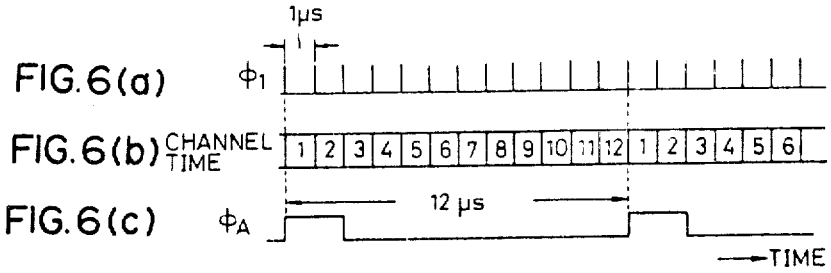
FIG. 7
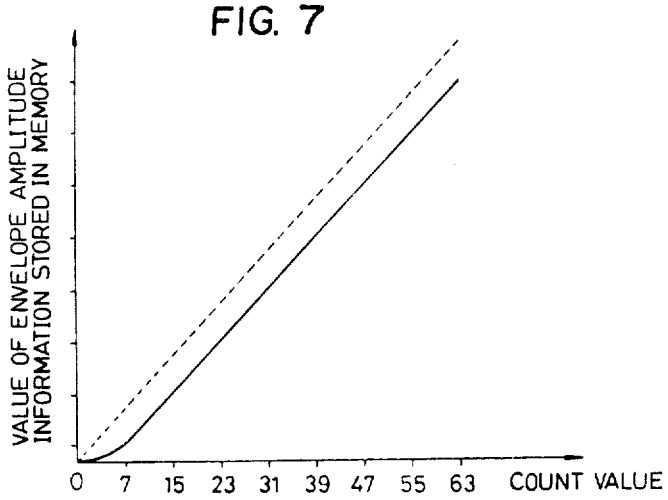
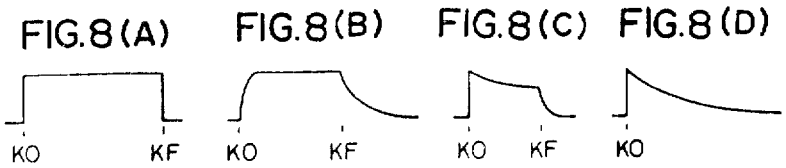

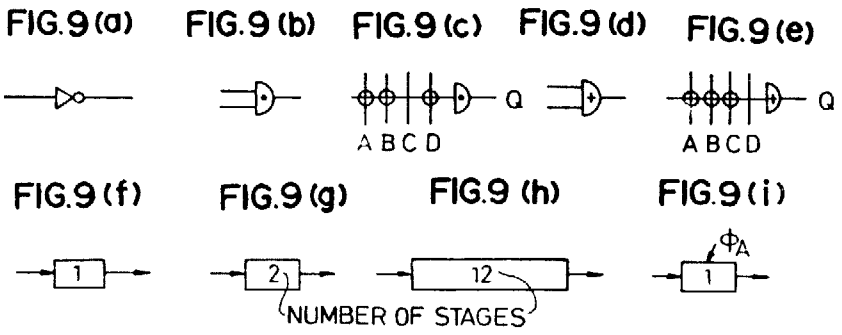
FIG. 10
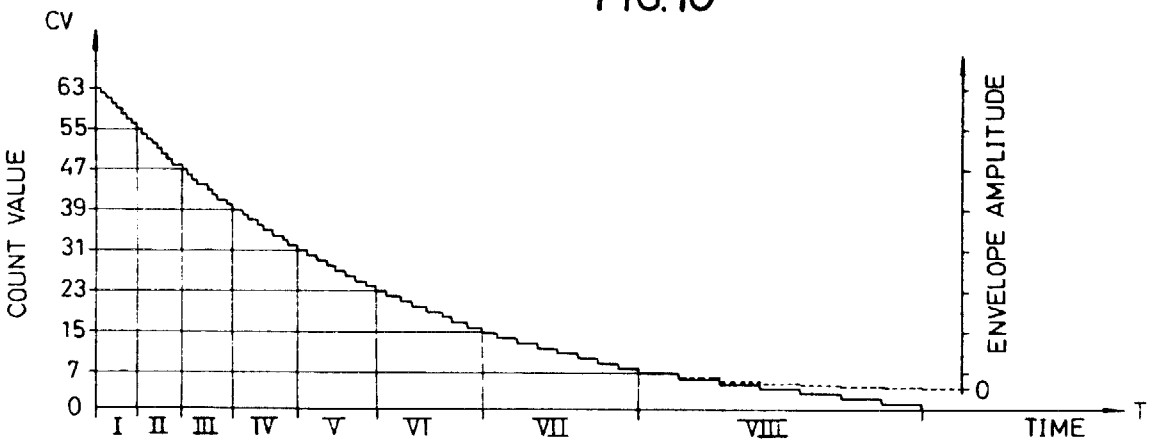

ENVELOPE GENERATOR

Matter enclosed in heavy brackets [ ] appears in the original patent but forms no part of this reissue specification; matter printed in italics indicates the additions made by reissue.

BACKGROUND AND SUMMARY OF THE INVENTION

This invention relates to an improvement of an envelope generator used in an electronic musical instrument or the like.

An envelope generator is employed to generate controlled waveforms which are used in the case of controlling the amplitude envelope of a tone generated in an electronic musical instrument or in the case of controlling, with time, the characteristic of a voltage-controlled type circuit such as a voltage-controlled type filter or a voltage-controlled type amplifier. In a conventional envelope generator, the amplitudes at sample points in an envelope shape are sequentially stored in an envelope memory in advance, and the addresses of the sample point amplitudes to be read out of the memory are advanced sequentially by driving a memory readout control counter by means of a predetermined pulse signal. In this case, the addresses specified by the counter correspond to the generation times of the sample point amplitudes of the envelope shape. Therefore, if the sample point amplitudes are different in generation time even though they are equal in value, they must be stored in different addresses in the envelope memory. For instance, in the case of producing an envelope shape consisting of an attack part, a sustain part, and a decay part as shown in FIG. 1(a), the sequential sample point amplitudes of the attack part which is read out initially are stored in addresses 1 to 16, and the sequential sample point amplitudes of the decay part which is read out later are stored in addresses 17, 18, 19 and so on. Thus, even if there are the same amplitudes at the sample points in the attack part and the decay part, they are stored in different addresses. This method in which data equal in value are stored in different addresses is disadvantageous in that the efficiency in use of the memory is lowered.

Furthermore, in the case where a decay shape which, as shown in FIG. 1(b), varies in an exponential function manner is obtained by means of the conventional envelope generator, an envelope memory must be provided with addresses number (for instance twenty-one) is much larger than the number (for instance six) of amplitude variation steps. This is undoubtedly uneconomical.

In addition, in the case where an envelope shape varying exponentially with the number of addresses being equal to the number of amplitude variation steps as shown in FIG. 1(c) is obtained by the conventional envelope generator, the relationships between the amplitude values at the sample points (steps) to be stored in an envelope memory should be set up so as to be an exponential function. This is rather troublesome.

The above-described difficulties are caused by the fact that the conventional envelope generator can generate only the envelope shape which varies as stored in the envelope memory, and the memory read-out control counter is used only for sequentially reading an envelope shape just as stored in the memory.

Accordingly, it is an object of this invention to eliminate all of the above-described drawbacks accompanying a conventional envelope generator.

More specifically, an object of the invention is to provide an envelope generator, in which the contents stored in a memory are set up so that the amplitude values of an envelope shape correspond to the count values of a memory read-out control counter, and the count content of the counter is increased or decreased as desired through computation such as addition or subtraction, so as to generate an envelope shape which corresponds to the variations in count value of the counter.

Accordingly, an envelope of attack characteristic and an envelope of decay characteristic can commonly use the amplitude value of the same address in the memory respectively by increasing the count value of the counter and by decreasing the count value of the counter. For instance, in the case where the addresses in the memory are from "0" to "63", the attack part is formed by the amplitude values of 16 steps and the decay part is formed by the amplitude values of 47 steps in the conventional envelope shape generating method shown in FIG. 1(a); however, according to this invention each of the attack part and the decay part can be formed by the amplitude values of 63 steps, which leads to an improvement of the resolution degree of the envelope shape.

Another object of the invention is to provide an envelope generator in which an envelope shape varying in an expotential function manner is realized by causing a memory read-out control counter to perform exponential function computation using time as variable, so that the relationships between the amplitude values stored in the addresses in the memory are linear, and setting of the contents of the memory can be readily achieved.

A further object of the invention is to provide an envelope generator in which exponential function computations in approximation can be readily performed by combination of addition and subtraction. This can be achieved by performing a first computation in which the count value of the memory read-out control counter is subjected to subtraction (or addition) according to a clock pulse signal for every predetermined period of time, and by performing a second computation in which the count value of the aforementioned counter is subjected to addition (or subtraction) with the timing prescribed. In other words, by quickening (or delaying) stepwise the timing by which the count value of the counter is increased or decreased, the variation with time of the count value of the counter that is the difference between the computation results of the first and second computations is approximated to an exponential function in a polygonal line state.

For the above-described second computation, in addition to the memory read-out control counter, a fraction part counter is provided for carrying out a counting operation of bits less in significance than the least significant bit, or bits in fraction part, so that the data of predetermined higher significant bits in the memory read-out control counter are fed back to the fraction part counter for carrying out the counting operation, and the carry data "1" of the fraction part counter is supplied to the memory read-out control counter for carrying out the addition or subtraction. More specifically, as the amount of feedback (the amount of increase or decrease in the second computation) is varied according to the value of the predetermined higher significant bit data, the amount of increase or decrease in the second computation is changed when the count value of the counter is varied with the lapse of time. The time region where the aforementioned amount of feedback is constant is one where the count value of the counter varies linearly. The time point where the amount of feedback changes is a bend point in a polygonal line. The variation of the amount of feedback means variation of the value of the data of the predetermined higher significant bits fed back to the fraction part counter from the memory read-out control counter.

In the case where an exponential characteristic is approximated with polygonal lines, as it reaches the limit value (0) the linear region is increased, and therefore the exponential characteristic may not be sufficiently expressed in the vicinity of the limit value (0). Therefore in this invention, in a small part of the addresses in the vicinity of the limit value (0) of a memory adapted to store envelope amplitude values, the relationship between the amplitude values stored therein are preset so as to have an exponential characteristic; and the relationships between the amplitude values stored in the remaining larger part of addresses are linear as was described before. Thus, for a greater part of the envelope where the eponential characteristic can be obtained by the polygonal line approximation computation, the polygonal line approximation is employed; and for a small part in the vicinity of the limit value of the envelope where the exponential characteristic cannot be obtained by the polygonal line approximation, the exponential characteristic is simulated in an analog mode by reading the exponential characteristic shape stored, in a part of the memory. In this case, a considerably small part of the addresses is employed for storing the exponential characteristic, and the remaining part may be of linearity. Therefore, the memory can be readily set.

Accordingly, a still further object of the invention is to provide an envelope generator in which an envelope shape having exponential characteristic can be effectively generated by combination of the exponential characteristic approximation through the polygonal line computation and the analogous exponential characteristic approximation of a considerably small part of the envelope.

One example of this is shown in FIG. 10 described later. In FIG. 10, the polygonal line approximation of the exponential characteristic is carried out for regions I thorugh VII, and the exponential approximation is carried out in an analog mode by utilizing the storage data in the memory as indicated by the broken line for the last region VIII. In this last region VIII, the count value of the counter is varied (decreased) linearly as indicated by the solid line, and the envelope amplitude level read out in correspondence to the count value thus varied is varied (decreased) as indicated by the broken line.

The novel features which are considered characteristic of this invention are set forth in the appended claims. This invention itself, however, as well as other objects and advantages thereof will be best understood by reference to the following detailed description when read in conjunction with the accompanying drawings, in which like parts are designated by like numerals or characters.

BRIEF DESCRIPTION OF THE DRAWINGS

In the accompanying drawings:

FIG. 2 is a block diagram illustrating one example of the envelope generator according to this invention;

[FIG. 6 is] *FIGS. 6(a), 6(b), and 6(c) are* a set of timing graphs indicating the time relation of clock pulses employed in the envelope generator shown in FIG. 2;

FIG. 7 is a graphical representation indicating relationships between the count values of a counter and the contents stored in a memory employed in the envelope generator;

[FIG. 8 is] *FIGS. 8(a) through 8(d) are* a set of graphs indicating envelope shapes in various modes which can be generated by the aforementioned envelope generator;

[FIG. 9 is] *FIGS. 9(a) through 9(i) are* a set of diagrams indicating methods of illustrating a variety of circuit elements;

FIG. 10 is a graphical representation indicating variations in count value of a counter in detail in the case where a decay envelope shape of exponential characteristic is generated by the polygonal line approximation with envelope amplitude levels on the right-hand vartical line, count values in the last region VIII being converted into exponential function values as indicated by the broken line;

DETAILED DESCRIPTION OF THE INVENTION

One preferred embodiment of this invention will be described with reference to the accompanying drawings.

Shown in FIG. 2 is an envelope generator 10 which is utilized for envelope control of an electronic musical instrument. A keyboard code $K_1$, $K_2$ is produced when a key of a keyboard (not shown) is depressed, and it represents the sort of keyboard to which the key thus depressed belongs. The relationships between the contents of the key codes $K_1$, $K_2$ and the sorts of keyboards are as indicated in Table 1 below:

TABLE 1

| | $K_1$ | $K_2$ |
|---|---|---|
| Upper keyboard | 1 | 0 |

TABLE 1-continued

| | $K_1$ | $K_2$ |
|---|---|---|
| Lower keyboard | 0 | 1 |
| Pedal keyboard | 1 | 1 |

A decay start signal DS is provided when the depression of the key which has produced the aforementioned keyboard code $K_1$, $K_2$ is released. When the envelope generator 10 has produced one envelope shape, a decay finish signal DF is provided, as described later. If the decay start signal DS and the decay finish signal DF are provided simultaneously, a clear signal CC is produced. Upon production of this clear signal CC, the decay start signal DS and the keyboard code $K_1$, $K_2$ are cleared. Accordingly, the keyboard code $K_1$, $K_2$ is kept produced for the period of time from the depression of key to the generation of the clear signal CC, and represents the fact that the tone of the key depressed is being produced by the electronic musical instrument. On the other hand, the decay start signal DS is produced for the period of time from the release of key to the production of the clear signal CC, and represents the fact that the tone of the key depressed is being produced but decayed. An attack pulse AP is a single pulse which is produced when a key is depressed.

Figure 1:
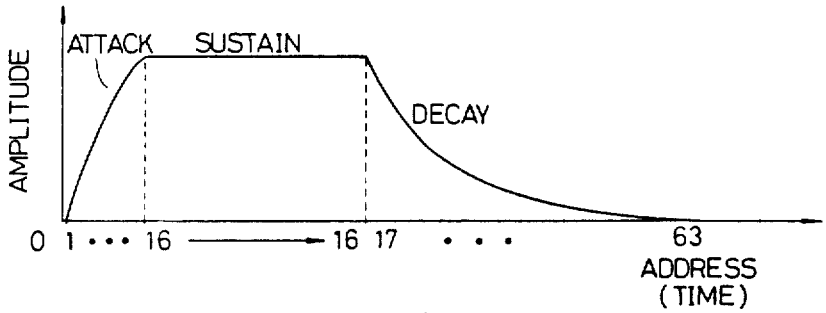
FIG. 1(a), (b) and (c) is a set of graphs for a description of a conventional envelope generating method with a conventional envelope generator.
Figure 1:
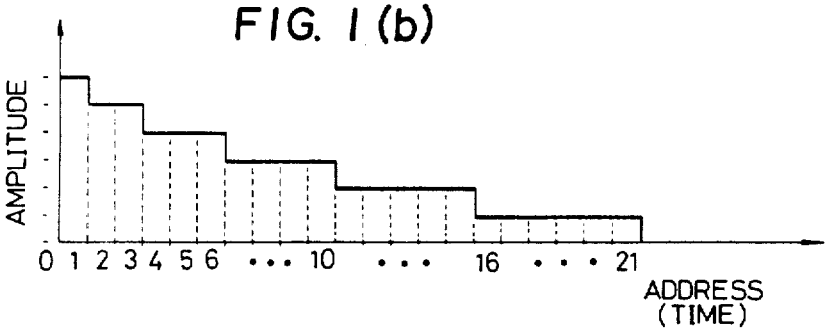
Figure 1:
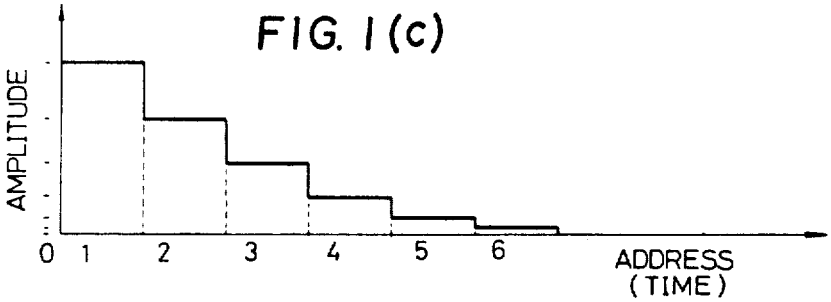
Figure 3:
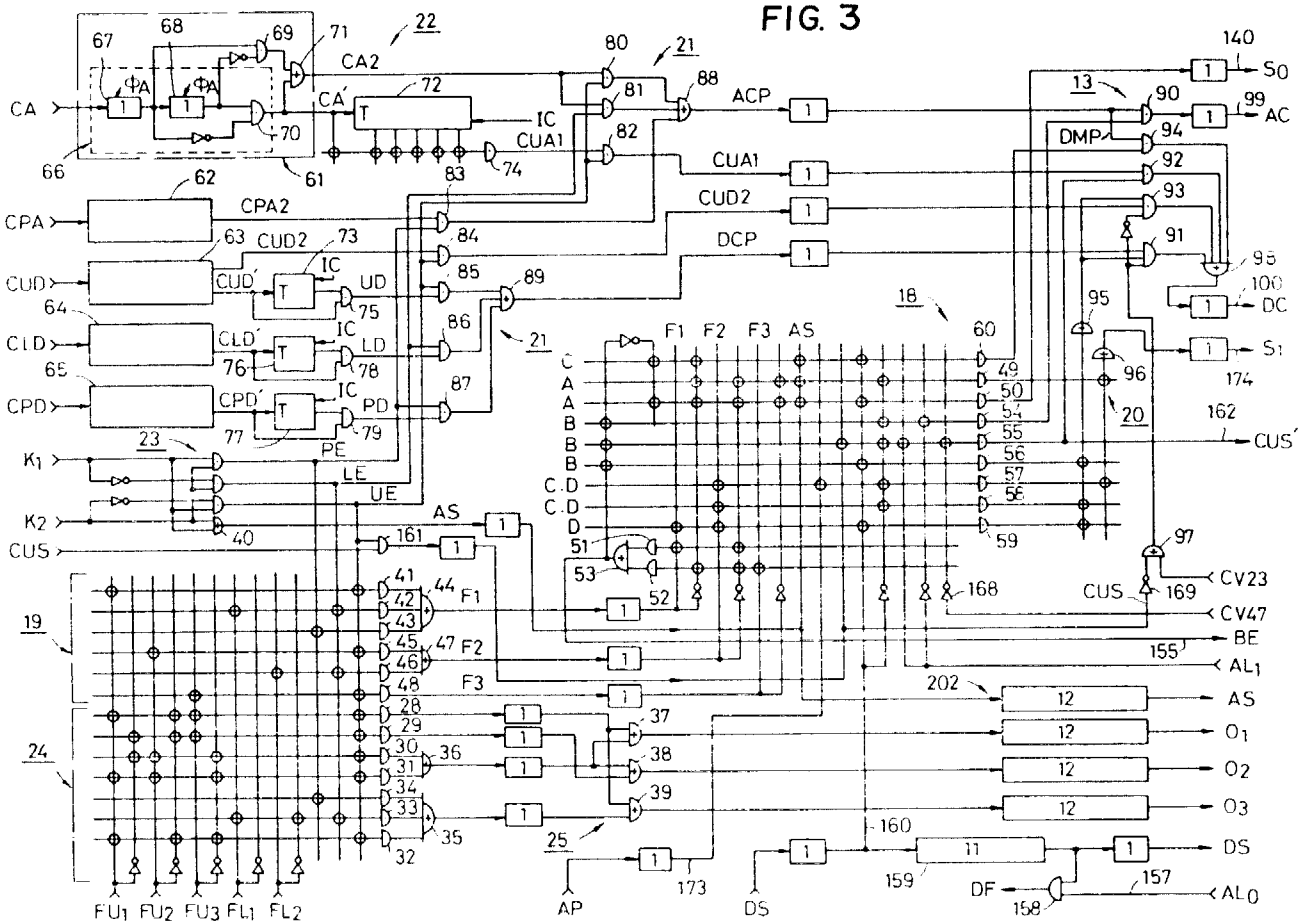
FIGS. 3, 4 and 5 are three parts of FIG. 2, FIG. 3 being a block diagram showing circuit elements around a count operation control section in detail, FIG. 4 being a block diagram showing circuit elements around a counter section in detail, FIG. 5 being also a block diagram illustrating circuit elements around a memory section in detail.
Figure 4:
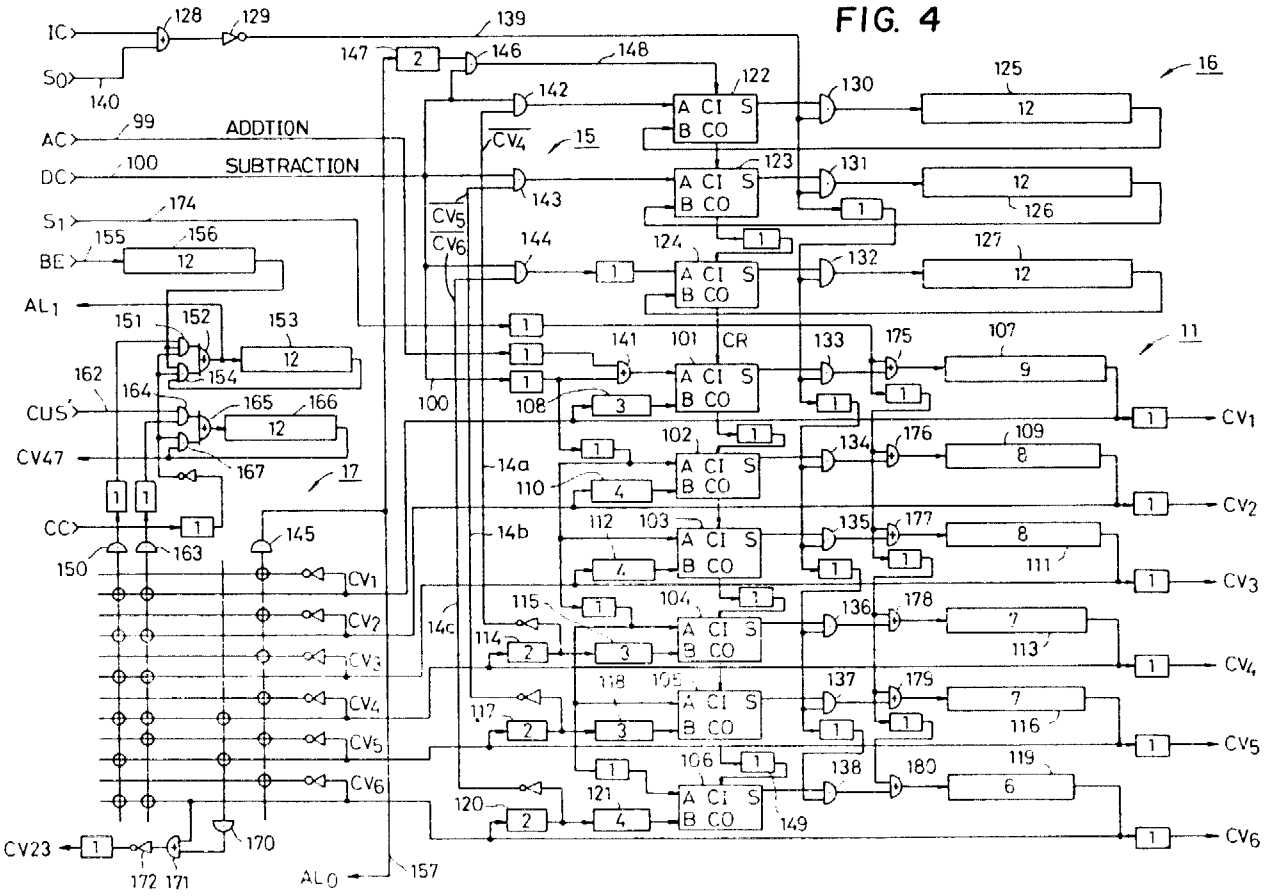
Figure 5:
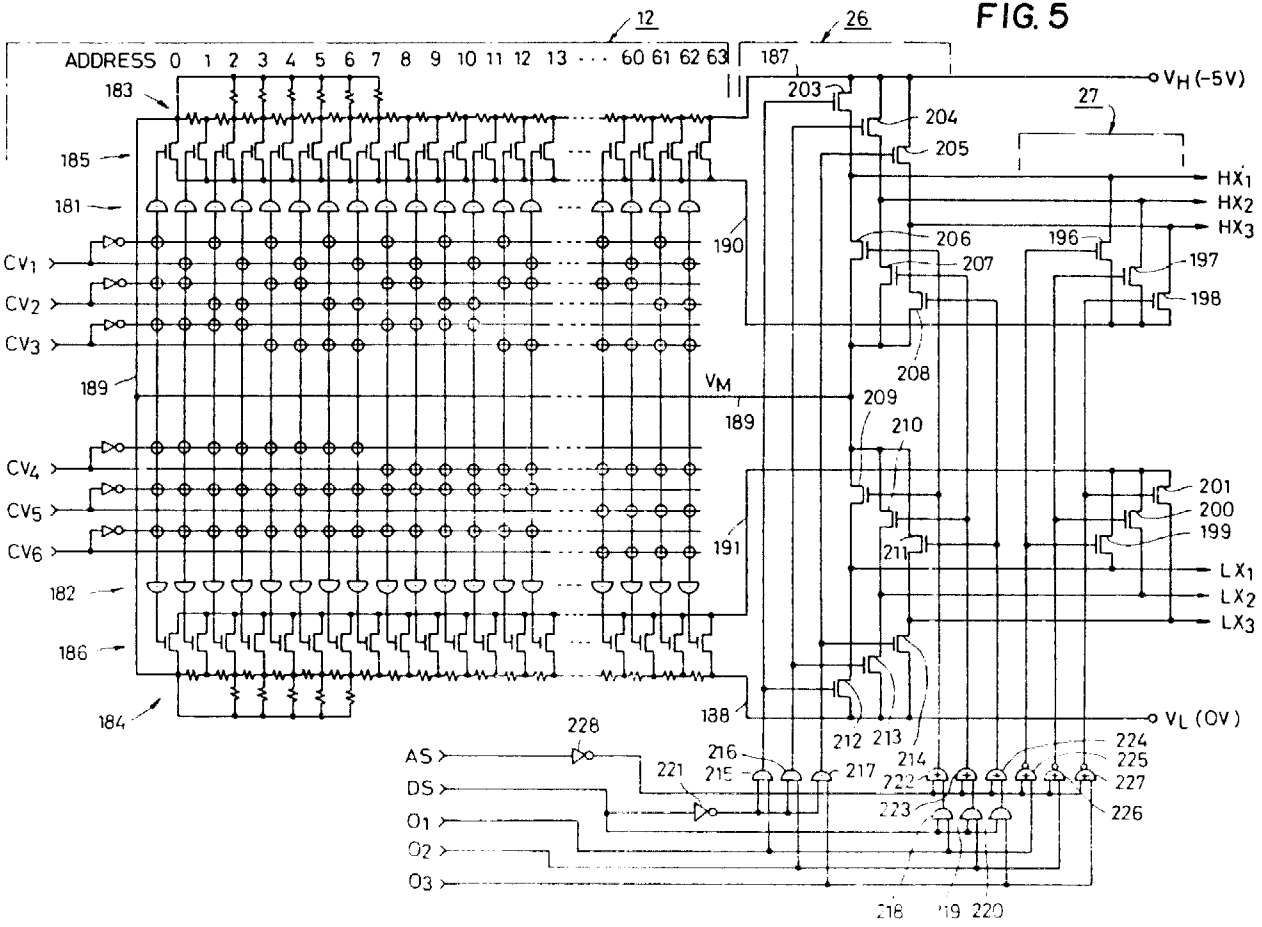

These signals $K_1$, $K_2$, DS, CC and AP are produced by a tone production assignment circuit (not shown), which may be referred to as "a key assignor" or "a channel processor" of the electronic musical instrument, and are applied to the envelope generator 10. The tone production assignment circuit is capable of simultaneously producting plural tones through time sharing treatment and assigning the tone of one depressed key to one of a plurality of time-shared tone production channels. Accordingly, the above-described signals $K_1$, $K_2$, DS, CC and AP are supplied in time-sharing manner in synchronization with the time of the channel assigned to which production of the tone of the depressed key has been assigned. Therefore, the envelope generator 10 operating by receiving these signals $K_1$, $K_2$, DS, CC and AP can carry out a time sharing operation which is illustrated in FIGS. 3 to 5 in detail.

FIG. 6(a) is a graphical representation indicating a main clock pulse $\phi_1$ which is adapted to control the time sharing operation of each channel. The period of the main clock pulse is, for instance, one microsecond ($10^{-6}$ second). As the number of channels is twelve (12), time slots (each having 1 microsecond in time width) obtained by sequentially dividing time with the clock pulses $\phi_{11}$ correspond to the first to twelfth channel times, respectively. Hereinafter, as is shown in FIG. 6(b) the time slots will be referred to as the first through twelfth channel times, respectively, when applicable. It goes without saying that the channel times are cyclically provided. A synchronization clock pulse $\phi_A$ as shown in FIG. 6(c) has a period of twelve microseconds and is employed for allowing an attack clock pulse and a decay clock pulse (described later) to synchronize with the whole channel time (12 microseconds).

Referring back to FIG. 2, the count output of a counter 11 is applied to a memory 12 where it is converted into envelope amplitude information whose value corresponds to the count value CV thereof. The contents in the memory 12 are as shown in FIG. 7, for instance, showing an exponential characteristic in the vicinity (0–7) of the count value 0 and a linear characteristic in the other count values (8–63). It goes without saying that amplitude information indicating a linear relation with the whole count values (0–63) as shown by the broken line may be stored in the memory 12.

The count value of the counter 11 is increased by the attack clock pulses AC supplied from a clock gate 13 thereto and is decreased by the decay clock pulses DC also supplied from the clock gate 13 thereto. In the case where an exponentially varying decay envelope is obtained by the polygonal line approximation, the data of predetermined higher significant bits in the counter 11 is fed back to a fraction part counter 16 through a line 14 and a gate 15 at a timing of the decay clock pulse DC. A carry signal CR is provided as a result of the computaion effected by the fraction part counter 16. This carry signal CR is applied to the addition input of the counter 11. Accordingly, the extent of the subtraction by the decay clock pulses DC is changed according to the frequency of application of the carry signals CR, and the count value CV is changed exponentially.

The change with time of the count value CV of the counter 11 corresponds to the shape of the envelope generated. Therefore, a variety of envelope shapes can be obtained by controlling the count operation of the counter 11. A count value detecting circuit 17 operates to detect the fact that the count value of the counter 11 has reached a predetermined value, and to supply a signal representative of a state of the counter 11 to an envelope generation control logic 18. This envelope generation control logic 18 operates to generate an envelope shape as desired by controlling the addition or subtraction, count speed, count start, and count stop of the counter 11. The mode of an envelope shape is determined with the aid of envelope mode selecting signals F1–F3 provided by an envelope mode selection logic 19. Furthermore, the shape of the envelope shape designated by the envelope mode selecting signals F1–F3 can be switched by a curve selecting signal CUS applied to the envelope mode selection logic 19.

A clock selection circuit 20 operates to open the clock gate 13 with the aid of the output of the envelope generation control logic 18, and to allow one of a plurality of clock pulses supplied from a channel clock selection gate 21 to be applied, as the attack clock pulse AC or the decay clock pulse DC, to the counter 11. In this example, different attack clock pulses or decay clock pulses are employed separately according to the sorts of keyboards, whereby with the same envelope shape the attack time or the decay time is changed separately according to the sorts of keyboards. Therefore, attack clock signals CA for the upper and lower keyboards, an attack clock signal CPA for the pedal keyboard, a decay clock signal CLD for the lower keyboard, a decay clock signal CUD for the upper keyboard, and a decay clock signal CPD for the pedal keyboard are generated separately and are applied through a clock synchronization circuit 22 to the channel clock selection gate 21. The clock synchronization circuit 22 operates to cause the pulse widths of the aforementioned clock signal CA–CPD to synchronize with one cyclical period (12 microseconds) of the whole channel time.

A keyboard detection circuit 23 serves to decode the keyboard code $K_1$, $K_2$ and to output an upper keyboard signal UE, a lower keyboard signal LE, or a pedal keyboard signal PE according to the content thereof. If either of the data $K_1$ and $K_2$ is "1", the keyboard detection circuit 23 produces an attack start signal AS representing that by the depression of the key, the concerning channel should be in a tone production mode. The keyboard signals UE, LE, and PE operate to open the channel clock selection gate 21 in time sharing manner according to the respective time slots corresponding to their generations, and to select in time sharing manner the clock pulses corresponding to the keyboards of the tones assigned to the channels. The clock pulses thus selected are multiplexed separately according to the attack clock pulse and the decay clock pulse, and are supplied to the clock gate 13.

The envelope mode selection logic 19, basing on envelope function switching data $FU_1$, $FU_2$, $FU_3$, $FL_1$ and $FL_2$ and the keyboard signals UE, LE and PE, outputs in time sharing manner envelope mode selecting signals F1, F2 and F3 corresponding to functions selected by the player.

In the envelope generator 10 of this example, three envelope shapes are produced in a parallel mode from three groups $X_1$, $X_2$ and $X_3$ and four envelope modes as shown in FIGS. 8(A) through (D) can be provided. FIGS. 8(A) through (D) indicate a direct keying mode, a sustain mode, a percussive damp made, and a percussion mode, respectively. In FIG. 8, reference characters KO and KF are intended to designate the timing of the key-on and that of the key-off, respectively. In general, the envelope shape of the direct keying mode and one of the envelope shapes of the remaining three modes are combined and are distributed suitably to the three groups $X_1$, $X_2$ and $X_3$ thereby to produce tones.

The 3-bit envelope function switching data $FU_1$, $FU_2$ $FU_3$ are to select the envelope functions of the upper keyboard tons, while the 2-bit envelope function switching data $FL_1$ and $FL_2$ are to select the envelope functions of the lower keyboard tone. For the pedal keyboard tone, it is unnecessary to provide selection data especially, because only one envelope function is selected at all times. Thus, in this example, the envelope functions can be selected separately according to the sorts of keyboards. In this connection, it is obvious that the data $FU_1$, $FU_2$, $FU_3$, $FL_1$ and $FL_2$ are set by switching means (not shown). The term "envelope function" as herein used is intended to mean combination of envelope modes distributed to the groups $X_1$, $X_2$ and $X_3$. Accordingly, the envelope function switching data $FU_1$, $FU_2$, $FU_3$, $FL_1$ and $FL_2$ are to represent which mode of envelope shape should be distributed to which group ($X_1$, $X_2$ or $X_3$) in the channel of the upper or lower keyboard tone. In order to process the function switching data separately according to the channels, the time-shared keyboard signal UE, LE and PE are applied to the envelope mode selection logic 19 and an envelope function decoder 24.

The envelope shapes as shown in FIGS. 8(B), (C) and (D) which change with time are produced by the system of the counter 11 and the memory 12 with the aid of the control operation of the envelope generation control logic 18. The direct keying shape as shown in FIG. 8(A) is produced by the system of a direct keying shape generating system decoder 25 and a direct keying shape generating section 26. It goes without saying that the counter 11 and the memory 12 may be employed for producing the direct keying shape only.

The envelope function decoder 24 serves to decode in time sharing manner the function switching data including the direct keying mode, and to apply a time-shared decoded output to the direct keying shape generation system decoder 25. The decoder 25 is so designed that it produces outputs $O_1$, $O_2$ and $O_3$ corresponding to the groups $X_1$, $X_2$ and $X_3$. More specifically it outputs the direct keying shape selecting signal ($O_1$, $O_2$, or $O_3$) in correspondence to the group ($X_1$, $X_2$ or $X_3$) which should produce the direct keying mode envelope shape in the envelope function decoded by the above-described envelope function decoder 24.

The direct keying shape generating section 26 produces the envelope shape of the direct keying mode in the group $X_1$, $X_2$ or $X_3$ to which the direct keying shape selecting signal $O_1$, $O_2$ or $O_3$ is supplied. In the group $X_1$, $X_2$ or $X_3$ corresponding to the selecting signal $O_1$, $O_2$ or $O_3$, the direct keying shape (FIG. 8(A)) having a constant level is produced for the period of time from the generation of the attack start signal AS to the generation of the decay start signal DS, that is, the period of time from the depression of a key to the release of the key.

A memory output distribution gate 27 serves to distribute the envelope shape signals read out of the memory 12 to any one of the groups $X_1$–$X_3$ where no direct keying shape selecting signals $O_1$–$O_3$ are provided. For instance, in the case where the direct keying mode envelope shapes are produced in the groups $X_1$ and $X_2$, and the percussion mode envelope shape is produced in the group $X_3$, the percussion mode envelope shape is produced in the system of the counter 11 and the memory 12, and this envelope shape is distributed to the group $X_3$ by the gate 27.

The counter 11, the gate 15, the fraction part counter 16, and the count value detection circuit 17 in the envelope generator 10 shown in FIG. 2 are illustrated in FIG. 4 in more detail. The memory 12, the direct keying shape generating section 26 and the memory output distribution gate 27 are illustrated in FIG. 5 in detail. The remaining elements around the envelope generation control logic 18 are illustrated in FIG. 3 in detail.

Before describing the various elements in FIGS. 3 to 5 in detail, a variety of symbols or figures employed therein will be described with reference to FIG. 9. FIG. 9(a) shows an inverter, FIGS. 9(b) and 9(c) show AND circuits, and FIGS. 9(d) and 9(e) show OR circuits. In the AND circuits and the OR circuits, if the number of inputs are relatively small, an illustration method as shown in FIGS. 9(b) and 9(d) is employed; and if the number of inputs are relatively large or some out of hte number of signals are selectively applied thereto, an illustration method as shown in FIGS. 9(c) and 9(e) is employed. In the illustration method shown in FIGS. 9(c) and 9(e), one input line is provided on the input side of the circuit, and signal lines are intersected with the input line, the intersections of the input line and the signal lines being encircled. Accordingly, in the case of FIG. 9(c), the logical expression is $Q=A\cdot B\cdot D$. In the case of FIG. 9(e), the logical expression is $Q=A+B+C$. Shown in each of FIGS. 9(f), 9(g) and 9(h) is a shift register for delay of 1-bit signals (or a delay flip-flop circuit). The numeral ("1" or "12") in the block is intended to designate the number of delay stages. In the case where no shift clock signal is indicated as in FIGS. 9(f), 9(g) and 9(h), the shifting is carried out by the above-described main clock pulse $\phi_1$ (in practice, a two-pulse clock signal is used). For instance, a "one" stage shifting means the delay of one microsecond. In the case where a clock pulse $\phi_A$ is indicated as the shift clock signal as in FIG. 9(i), the circuit is a delay flip-flop circuit controlled by clock pulses $\phi_A$ applied at a period of 12 microseconds thereto (in practice, a two-phase clock signal is employed).

In this example, the signal in each channel processed in time sharing manner. Therefore, it is inevitably necessary to coincide the signals in one and the same channel in a process where the signals are allowed to pass through a variety of delay elements. Accordingly, delay flip-flop circuits and shift registers such as those shown in FIG. 9(f) through (i) are provided for timing adjustment at a number of places in the circuits shown in FIGS. 3 to 5, but they will not be designated by reference characters.

As was described before, switching of the envelope modes produced by the output groups $X_1$, $X_2$ and $X_3$ of the envelope generator 10 is carried out on the basis of the envelope function switching data $FU_1$–$FU_3$, $FL_1$ and $FL_2$. The relationships between the envelope function switching data of the keyboards and the envelope modes outputted by the groups $X_1$, $X_2$ and $X_3$ are indicated in Table 2 below.

TABLE 2

| | | Function switching data | | | Modes of the groups | | | Direct keying shape selecting signals | | |
|---|---|---|---|---|---|---|---|---|---|---|
| | No. | $FU_1$ | $FU_2$ | $FU_3$ | $X_1$ | $X_2$ | $X_3$ | $O_1$ | $O_2$ | $O_3$ |
| Upper key-board | 1 | 0 | 0 | 0 | A | A | A | 0 | 0 | 0 |
| | 2 | 1 | 0 | 0 | B | B | A | 0 | 0 | 1 |
| | 3 | 1 | 1 | 0 | A | A | D | 1 | 1 | 0 |
| | 4 | 0 | 1 | 0 | A | A | C | 1 | 1 | 0 |
| | 5 | 0 | 0 | 1 | B | A | B | 0 | 1 | 0 |
| | 6 | 1 | 1 | 1 | D | D | D | 0 | 0 | 0 |
| | 7 | 0 | 1 | 1 | C | C | C | 0 | 0 | 0 |
| | 8 | 1 | 0 | 1 | A | B | A | 1 | 0 | 1 |
| | | $FL_1$ | $FL_2$ | | | | | | | |
| Lower key-board | 1 | 0 | 0 | | A | A | A | 0 | 0 | 0 |
| | 2 | 1 | 0 | | B | B | A | 0 | 0 | 1 |
| | 6 | 1 | 1 | | D | D | D | 0 | 0 | 0 |
| | 7 | 0 | 1 | | C | C | C | 0 | 0 | 0 |
| Pedal key-board | 2 | Fixed | | | B | B | A | 0 | 0 | 1 |

In Table 2:

Reference character "A" designates a direct keying mode such as shown in FIG. 8(A);

Reference character "B" designates a sustain mode such as shown in FIG. 8(B);

Reference character "C" designates a percussive damp mode such as shown in FIG. 8(C); and Reference character "D" designates a percussion mode such as shown in FIG. 8(D).

Numerals 1 through 8 listed in the left column of Table 2 are intended to designate the envelope function numbers, in which like numerals specify like functions (being equal in combination of the envelope modes produced from the groups $X_1$, $X_2$ and $X_3$). For instance, the number obtained when the switching data $FU_1$, $FU_2$ and $FU_3$ of the upper keyboard are "1 1 1" and the number obtained when the switching data $FL_1$ and $FL_2$ of the lower keyboard are "1 1", are equal to each other, i.e. No. 6 function. In the case of the pedal keyboard note, the switching data are fixed or the function number is fixed to No. 2, and therefore, the envelopes in the sustain mode B and the direct keying mode A are provided.

Indicated in the right column of Table 2 are the contents of the direct keying shape selecting signals $O_1$, $O_2$ and $O_3$ corresponding to the contents of the envelope function switching data. The signals $P_1$, $O_2$ and $O_3$ correspond to the groups $X_1$, $X_2$ and $X_3$, respectively. In a group wherein contents of the signal $O_1$, $O_2$ or $O_3$ are "1", the envelope shape in the direct keying mode produced by the direct keying shape generating section 26 is outputted; and in a group wherein contents of the signal are "0", the envelope shape produced by the system of the counter 11 and the memeory 12 is outputted. In addition, it should be noted that the circuit is so designed that when all of the groups $X_1$, $X_2$ and $X_3$ produce the envelopes in the direct keying mode, the system of the counter 11 and the memory 12 produces the direct keying shape. Accordingly, in the case when all of the groups $X_1$, $X_2$ and $X_3$ are of the direct keying mode A, all of the direct keying shape selecting signals $O_1$, $O_2$ and $O_3$ are "0".

Referring back to FIG. 3, a logical circuit is formed in the envelope function decoder 24 so that when a function is selected in which it is necessary to allow the direct keying shape generating section 26 (FIG. 2) to produce the envelope in the direct keying mode, the function selection is detected and the decoded outputs are provided separately according to the channels. Referring to Table 2, such functions are found in the lines of Nos. 2, 3, 4, 5 and 8. Accordingly, when with the upper keyboard tones the function switching data $FU_1$, $FU_2$ and $FU_3$ have the data shown in the lines described above, AND circuits 28 through 32 operate as in the following logical expressions: The AND circuits 28 through 32 are made operable by the upper keyboard signal UE.

AND circuit 28 (detecting No. 8)

$FU_1\,\overline{FU_2}\,FU_3\,UE$

AND circuit 29 (detecting No. 5)

$\overline{FU_1}\,\overline{FU_2}\,FU_3\,UE$

AND circuit 30 (detecting No. 4)

$\overline{FU_1}\,FU_2\,\overline{FU_3}\,UE$

AND circuit 31 (detecting No. 3)

$FU_1\,FU_2\,\overline{FU_3}\,UE$

AND circuit 32 (detecting No. 2)

$FU_1\,\overline{FU_2}\,\overline{FU_3}\,UE$

Furthermore, in the case of the lower keyboard tone, a logic of $FL_1 \cdot \overline{FL_2} LE$ is provided in an AND circuit 33 so that the latter operates when the function switching data $FL_1$ and $FL_2$ have the data shown in the line of No. 2.

As the function of the pedal keyboard tone is fixed to No. 2, an AND circuit 34 is enabled by the pedal keyboard signal PE. It is obvious that the signal PE can be applied directly to an OR circuit 35 without the provision of the AND circuit 34.

Function Nos. 3 and 4 out of Function Nos. 2, 3, 4, 5 and 8 are for distributing the direct keying mode A to the groups $X_1$ and $X_2$. Therefore, the outputs of the AND circuits 30 and 31 are applied through an OR circuit 36 to OR circuits 37 and 38 in the direct keying shape generation system decoder 25. In this decoder 25, the OR circuit 37 outputs the direct keying shape selecting signal $O_1$ corresponding to the group $X_1$, the OR circuit 38 outputs the signal $O_2$ corresponding to the group $X_2$, and the OR circuit 39 outputs the signal $O_3$ corresponding to the group $X_3$. As Function No. 5 is for distributing the direct keying mode A to the series $X_2$, the output of the AND circuit 29 is applied to the OR circuit 38 of the decoder 25. As Function No. 8 is for distributing the direct keying mode A to the groups $X_1$ and $X_3$, the output of the AND circuit 28 is applied to the OR circuits 37 and 39 of the decoder 25. As Function No. 2 is for distributing the direct keying mode A to the group $X_3$, the outputs of the AND circuits 32, 33 and 34 are applied through the OR circuit 35 to the OR circuit 39 of the decoder 25.

Accordingly, the direct keying shape selecting signals $O_1$, $O_2$ and $O_3$ are produced according to the values of the function switching data $FU_1$, $FU_2$, $FU_3$, $FL_1$ and $FL_2$, as indicated in the right column of Table 2.

The upper keyboard signal UE, the lower keyboard signal LE, and the pedal keyboard signal PE are generated in synchronization with the channel times to which the tones of the keyboards are assigned, with the keyboard code $K_1$, $K_2$ being decoded by the keyboard detection circuit 23. In the keyboard detection circuit 23, an OR circuit 40 receives the data of bits $K_1$, $K_2$ and produces the attack start signal AS in synchronization with the time of the channel at which the key board code $K_1$, $K_2$ is present, i.e., to which the production of a tone of the depressed key is assigned.

The envelope modes selecting signals F1, F2 and F3 produced by the envelope mode selection logic 19 are representative of the modes of envelope shapes which are to be produced by the system of the counter 11 and the memory 12. The envelope mode selection logic 19 produces the envelope mode selecting signals F1, F2 and F3 by collecting the function switching data provided separately according to the keyboards onto common lines. In other words, if function numbers are equal, the values of the data $FU_1$ and $FU_2$ are equal to those of the data $FL_1$ and $FL_2$. Accordingly, logic circuits are formed so that the data $FU_1$ and $FL_1$ and are collected to form the data FL, the data $FU_2$ and $FU_1$ are collected to form the data F2, and the data $FU_3$ is formed into the data F3. Since the function of the pedal keyboard tone is fixed to No. 2, no particular switching data is provided; however, all that is necessary for the function of the pedal keyboard tone is to produce signals F1, F2 and F3 whose values are equal to the value "1 0 0" in Function No. 2 of the switching data $FU_1$, $FU_2$ and $FU_3$ of the upper keyboard. As the switching data $FU_1$, $FU_2$, $FU_3$, $FL_1$ and $FL_2$ are applied in direct current mode, the data are selected by the keyboard signals UE, LE and PE in synchronization with the channel times to which the keyboards are assigned, and the envelope mode selecting signals F1, F2, and F3 in time sharing manner separately according to the channels.

Accordingly, in the envelope mode selection logic 19, the data $FU_1$ and the upper keyboard signal UE are inputted to an AND circuit 41, the data $FL_1$ and the lower keyboard signal LE are inputted to an AND circuit 42, the pedal keyboard signal PE is applied to an AND circuit 43, and the outputs of these AND circuits 41, 42,and 43 are applied to an OR circuit 44 to obtain the data F1. In this connection, it is not always necessary to provide the AND circuit 43; that is, the signal PE can be applied directly to the OR circuit 44. The data $FU_2$ and the upper keyboard signal UE are applied to an AND circuit 45, the data $FL_2$ and the lower keyboard signal LE are applied to an AND circuit 46, and the outputs of the two AND circuits 45 and 46 are applied to an OR circuit 46 to obtain the data F2. The data $FU_3$ are the upper keyboard signal UE are applied to an AND circuit 48 to obtain the data F3.

Indicated in the following Table 3 are relationships between the values of the envelope mode selecting signals F1, F2 and F3 and the envelope modes selected thereby.

TABLE 3

| Mode | | F1 | F2 | F3 |
|---|---|---|---|---|
| Direct keying | (A) | 0 | 0 | 0 |
| Sustain | (B) | 1 | 0 | 0 |

TABLE 3-continued

| Mode | | F1 | F2 | F3 |
|---|---|---|---|---|
| | | 0 | 0 | 1 |
| | | 1 | 0 | 1 |
| Percussive damp | (C) | 0 | 1 | 0 |
| | | 0 | 1 | 1 |
| Percussion | (D) | 1 | 1 | 0 |
| | | 1 | 1 | 1 |

In the envelope generation control logic 18, AND circuits provided respectively for the envelope modes are enabled according to the values of the envelope mode selecting signals F1, F2 and F3.

In the case of the direct keying mode A, the signals F1, F2 and F3 are "0 0 0", and therefore AND circuits 49 and 50 to which the inversion signals of these signals are applied are made operable.

In the case of the sustain mode B, the signals F1 and F2 are "1 0" or the signals F1 through F3 are "0 0 1". The signals are detected by an AND circuit 51 or 52, and the detection signal is applied to an OR circuit 53 to obtain the sustain mode selecting signal BE. The output "1" of the OR circuit 53 enables AND circuits 54, 55 and 56.

In the cases of the percussive damp mode C and the percussion mode D, the signal F2 is "1" in both cases. Accordingly, AND circuits 57 and 58 which are used commonly for both of the modes C and D are enabled when the signal F2 is "1". The signals F1 and F2 have "1 1" only when the percussion mode is selected. Therefore, an AND circuit 59 for only the percussion mode is made operable when each of the signals F1 and F2 has "1". An AND circuit 60 provided for only the percussive damp mode C is enabled when the signal F1 is "0" and the output of the OR circuit 53 is "0" (other than the sustain mode B).

In the clock synchronization circuit 22, the upper and lower keyboard attack clock signal CA is applied to a rising and decaying differentiation circuit 61, while the pedal keyboard attack clock signal CPA is applied to a rising and decaying differentiation circuit 62. The upper keyboard decay clock signal CUD is applied to a rising and decaying differentiation circuit 63, while the lower keyboard decay clock signal CLD is applied to a decaying differentiation circuit 64. The pedal keyboard decay clock signal CPD is applied to a decaying differentiation circuit 65. Only the rising and decaying differentiation circuit 61 is illustrated in detail; however, the other rising and decaying differentiation circuits 62 and 63 are identical with the differentiation circuit 61. A block 66 encircled in the differentiation circuit 61 is a decaying differentiation circuit. The arrangement of each of the decaying differentiation circuit is identical with that of the block 66.

In each of the rising and decaying differentiation circuits 61 through 63, the clock signals are delayed by 12 microseconds by means of delay flip-flop circuits 67 and 68, respectively, which are controlled by the clock pulse $\phi_A$ having a period of 12 microseconds, and an AND circuit 69 produces a rising detection pulse 12 microseconds in pulse width in synchronization with the rising part of the input clock signal. The period of the rising detection pulse is equal to that of the input clock signal. In addition, an AND circuit 70 provides a decaying detection pulse 12 microseconds in pulse width in synchronization with the decaying part of the input clock signal. The rising detection pulse and decaying detection pulse are applied to an OR circuit 71. Thus, the circuits 61, 62 and 63 produce clock pulses CA2, CPA2 and CUD2, respectively, which have frequencies twice as high as those of input clock signals CA, CPA and CUD, respectively, and have a pulse width of 12 microseconds (twelve channel times).

In the aforementioned circuits 61 and 63, the decaying detection pulse is taken out of the AND circuit 70 so as to output as count clock pulses CA' and CUD' respectively for a counter 72 of modulo $2^5$ and a counter 73 of modulo $2^1$. When all of the 5-bit outputs of the counter 72 become "1" and the pulse CA' 12 microseconds in width is applied thereto, an AND circuit 74 output a signal "1". This output of the AND circuit 74 is utilized as a first curve selecting clock pulse CUA1. The frequency of this clock pulse CUA1 is $\frac{1}{2}^5$ of the frequency of the clock pulse CA' ($\frac{1}{2}^6$ pf of the frequency of the clock pulse CA2), and its pulse width is 12 microseconds.

An AND circuit 75 produces a pulse UD when its input conditions are established by the output of the counter 73 and the clock pulse CUD'. Therefore, the frequency of the pulse UD is $\frac{1}{2}$ of the frequency of the clock pulse CUD' ($\frac{1}{4}$ of the frequency of the clock pulse CUD2), and its pulse width is 12 microseconds.

The decaying differentiation circuits 64 and 65 operate similarly as in the aforementioned block 66, and produce clock pulses CLD' and CPD' equal in frequency to the clock pulses CLD and CPD, each of the pulses CLD' and CPD' having a pulse width of 12 microseconds. The clock pulses CLD' and CPD' are subjected to $\frac{1}{2}$ frequency division in counters 76 and 77 each having modulo 2, and are shaped to have a pulse width of 12 microseconds by AND circuits 78 and 79, respectively. It should be noted that upon energization of the envelope generator 10, the initial clear signal IC is applied to the reset terminals of the counters 72, 73, 76 and 77.

The upper and lower keyboard attack clock pulse CA2, the pedal keyboard attack clock pulse CPA2, the first curve selecting clock pulse CUA1, the second curve selecting clock pulse CUD2, the upper keyboard decay clock pulse UD, the lower keyboard clock pulse LD, and the pedal keyboard decay clock pulse PD, each synchronized to have the 12 microsecond pulse width, are supplied to the channel clock selection gate 21. In this gate 21, the upper keyboard signal UE makes AND gates 80, 82, 84 and 85 operable to select the clock pulses, CA2, CUA1, CUD2 and UD. The lower keyboard signal LE makes AND circuits 81 and 86 operable to select the clock pulses CA2 and LD. The pedal keyboard signal PE makes AND circuits 83 and 87 operable to select the clock pulses CPA2 and PD. In each of the pulses CA2 through PD, one pulse is synchronized with the 12 channel times. Therefore, these pulses can be selected in time sharing manner without changing their frequencies. The attack clock pulses CA2 and CPA2 selected in time sharing manner are applied, as an attack clock pulse ACP to an AND circuit 90 of the clock gate 13 through an OR circuit 88. The attack pulses UD, LD, and PD selected by the AND circuits 85, 86 and 87 are applied to an OR circuit 89 so as to be applied, as a decay clock pulse DCP, to an AND circuit 91 of the clock gate 13. The first curve selecting clock pulse CUA1 selected in time sharing manner is applied to an AND circuit 92 of the clock gate 13, while the second curve selecting clock pulse CUD2 is applied to an AND circuit 93 thereof. The output ACP of the aforementioned OR circuit 88 is applied also to an AND circuit 94 of the clock gate 13, and is utilized a clock pulse DMP for the percussive damp mode.

The clock pulses inputted to the AND circuits 90 through 94 of the clock gate 13 are selected by the outputs from the envelope generation control logic 18 or by control signals obtained through OR circuits 95, 96 and 97 of the clock selection circuit 20. The output of the AND circuit 90 is applied, as the attack pulse AC, to the counter 11 of modulo 64 through a line 99. The outputs of the AND circuits 91 through 94 are applied to an OR circuit 98 so as to be applied, as the decay clock pulse DC, to the counter 11 through a line 100.

The counter 11 comprises: an addition section of 16-bits made up of full-adders 101 through 106; and a 12-stage shift counter section for holding the addition result of each bit in time sharing manner for every channel. More specifically, the addition result of the least significant bit is held in a 9-stage shift register 107 and a 3-stage shift register 108, and the data of the second bit is held in an 8-stage shift register 109 and a 4-stage shift register 110. The data of the third bit is held in an 8-stage shift register 111 and a 4-stage shift register 112. The data of the fourth bit is held in a 7-stage shift register 113, a 2-stage shift register 114, and a 3-stage shift register 115. The data of the fifth bit is held in a 7-stage shift register 116, a 2-stage shift register 117, and a 3-stage shift register 118. The data of the most significant bit is held in a 6-stage shift register 119, a 2-stage shift register 120, and a 4-stage shift register 12. The reason why the 12-stage shift register is divided into several parts is for synchronization of the channel times for the above-described data. For this channel time synchronization, delay flip-flop circuits are provided in the counter 11; however, they are not designated by reference numerals.

The fraction part counter 16 of modulo 8 is made up of 3-bit full-adders 122, 123 and 124, and 12-stage shift registers 125, 126 and 127. In each of the full-adders 101 through 106 and 122 through 124, reference characters A and B designate input terminals, reference character CI designates a carry signal input terminal from a less significant bit, reference character S designates an output terminal for the addition result of a relevant bit, and reference character CO designates a carry signal output terminal. The addition result held in a shift register is fed back to the input terminal B of the respective adder and is added to the data which are applied to the input terminal A and the input terminal CI. The carry signal output terminals CO are successively cascade-connected to the carry signal input terminals CI of the more significant bits.

Upon energization the initial clear signal IC is applied, whereupon the signal of a counter clear line 139 is made to be "0" through an OR circuit 128 and an inverter 129, and AND circuits 130 through 138 in the counter 11 and the fraction part counter 16 are therefore made inoperable, as a result of which the count values of all the channels are cleared to be "0". The same thing occurs in the case also where a count value clear signal So is applied through a line 140 from the envelope generation control logic 18 shown in FIG. 3, as described later.

In production of the envelope having attack characteristics, the attack pulse AC as described later is applied through a line 99 and an OR circuit 141 to the adder 101 of the least significant bit in the counter 11, and the count value in the counter is increased.

In production of the envelope having decay characteristics, the decay clock pulse DC is applied through a line 100 to all of the adders 101 through 106 in the counter 11. Accordingly, in the counter 11 "1 1 1 1 1 1" is added for every timing of the decay clock pulse DC, which means that the content of the counter 11 is subtracted by "0 0 0 0 0 1". Thus, the value in the counter is decreased.

Polygonal line approximation of an envelope having exponential characteristics In this embodiment, an exponential characteristic polygonal line approximation is carried out with respect to the decay part of an envelope shape. For this purpose, AND circuits 142, 143 and 144 in the gate 15 of the fraction part counter 16 used for computation of the polygonal line approximation are so designed as to be enabled by the application of the decay clock pulse DC.

The data of the more significant bit in the counter 11 is fed back to the least significant bit (adder 101) through a feedback circuit including a computation circuit. The computation circuit included in the feedback circuit is the gate 15 and the fraction part counter 16, operating to convert the data of three higher bits in the counter 11, which are fed back through lines 14a, 14b and 14c, into a pulse CR having a speed corresponding to (inversely proportional to) the value of the data and to apply the pulse CR to the carry signal input terminal CI of the least significant bit adder 101 in the counter 11.

The data $CV_4$, $CV_5$ and $CV_6$ of the three higher bits of the counter 11 (the outputs of the adders 104, 105 and 106) are obtained from shift registers 114, 117 and 120, and are supplied to the lines 14a, 14b and 14c after being inverted respectively. The inversion data $\overline{CV}_4$, $\overline{CV}_5$, and $\overline{CV}_6$ supplied to the lines 14a, 14b and 14c are inputted to adders 122, 123, and 124 through AND circuits 142, 143, 144 for every generation timing of the decay clock pulse DC, respectively. Accordingly, the data $\overline{CV}_4$, $\overline{CV}_5$ and $\overline{CV}_6$ are repeatedly added by the fraction part counter 16 for every generation timing of the decay clock pulse DC. Since the fraction part counter 16 is of the three bits, whenever its count value reaches eight in decimal notation, a single carry signal CR is outputted by the adder 124. This carry signal CR is applied to the least significant bit adder 101 in the counter 11 so as to increase the value stored in the counter 11. On the other hand, simultaneously the decay clock pulse DC is applied to the counter 11 through the line 100 to decrease the value stored in the counter 11. Therefore, in practice, the count values $CV_1$ through $CV_6$ in the counter 11 are not changed when the carry signal CR is applied to the fraction part counter 16. In other words, the carry signal CR applied to the addition input of the counter 11 operates to prohibit the subtraction of the decay clock pulse DC from the value of the counter 11.

One example of this computation is indicated in Table 4 below. The numerals 1, 2, 3 . . . in the left column in Table 4 are representative of the timing of application of the decay clock pulse DC. The arrows in the column of the carry signal CR indicate the generation of the carry signal CR. It is assumed that the count value of the fraction part counter 16 is "0 0 0" when the count value of the counter 11 is "1 1 0 0 0 0". In this case, when the decay clock pulse DC is applied thereafter (Timing 2), the content of the fraction part counter 16 becomes "0 0 1" by the feedback data $\overline{CV}_6$, $\overline{CV}_5$ and $\overline{CV}_4$. In this operation, the count value of the counter 11 is subtracted to be "1 0 1 1 1 1".

TABLE 4

| DC's timing | Count value of counter 11 | | | | | | Carry CR | Count value of fraction part counter 16 | | |
|---|---|---|---|---|---|---|---|---|---|---|
| | $CV_6$ | $CV_5$ | $CV_4$ | $CV_3$ | $CV_2$ | $CV_1$ | | | | |
| 1 | 1 | 1 | 0 | 0 | 0 | 0 | ← | 0 | 0 | 0 |
| 2 | 1 | 0 | 1 | 1 | 1 | 1 | | 0 | 0 | 1 |
| 3 | 1 | 0 | 1 | 1 | 1 | 0 | | 0 | 1 | 1 |
| 4 | 1 | 0 | 1 | 1 | 0 | 1 | | 1 | 0 | 1 |
| 5 | 1 | 0 | 1 | 1 | 0 | 0 | | 1 | 1 | 1 |
| 6 | 1 | 0 | 1 | 1 | 0 | 0 | ← | 0 | 0 | 1 |
| 7 | 1 | 0 | 1 | 0 | 1 | 1 | | 0 | 1 | 1 |
| 8 | 1 | 0 | 1 | 0 | 1 | 0 | | 1 | 0 | 1 |
| 9 | 1 | 0 | 1 | 0 | 0 | 1 | | 1 | 1 | 1 |
| 10 | 1 | 0 | 1 | 0 | 0 | 1 | ← | 0 | 0 | 1 |
| 11 | 1 | 0 | 1 | 0 | 0 | 0 | | 0 | 1 | 1 |
| 12 | 1 | 0 | 0 | 1 | 1 | 1 | | 1 | 0 | 1 |
| 13 | 1 | 0 | 0 | 1 | 1 | 1 | ← | 0 | 0 | 0 |
| 14 | 1 | 0 | 0 | 1 | 1 | 0 | | 0 | 1 | 1 |
| . | | | . | | | . | | | . | |
| . | | | . | | | | | | . | |
| . | | | . | | | | | | . | |

The data $\overline{CV}_6$, $\overline{CV}_5$ and $\overline{CV}_4$ applied to the fraction part counter 16 through the gate 15 is obtained by inverting the three higher bits $CV_6$, $CV_5$ and $CV_4$ out of the computation result of the counter 11 in the previous computation timing. Therefore, at the computation timing 2, a value "0 0 1" obtained by inverting the data $CV_6$, $CV_5$ and $CV_4$ "1 1 0" provided at the computation timing 1 is applied to the fraction part counter 16. Accordingly, during the period of time from computation timing 3 to computation timing 12, the value "0 1 0" obtained by inverting the value "1 0 1" of the data $CV_6$–$CV_4$ is repeatedly applied to the fraction part counter 16. During the period of time from computation timing 2 to computation timing 5, no carry signal CR is produced by the fraction part counter 16. Therefore, the count value of the counter 11 is successively decreased by the decay clock pulse DC. However, at the computation timing 6, the computation result of the fraction part counter 16 bomes "1 0 0 1", whereby the carry signal CR is produced thereby. In this operation, in the counter 11 the data "1 1 1 1 1 1" due to the decay clock pulse DC operating as a subtraction input and the input data "0 0 0 0 0 1" due to the carry signal CR are added to the computation result "1 0 1 1 0 0" obtained at the previous computation timing 5. In the computation, the carry output CO is merely produced by the most significant bit adder 106, and no substantial computation is carried out. Therefore, the count value of the counter 11 is not changed. Similarly, when the carry signal CR is produced by the fraction part counter 16, the count value of the counter 11 is not changed.

The fraction part counter 16 is modulo 8. Therefore, if it is assumed that the decimal value of the feedback data $\overline{CV}_6$, $\overline{CV}_5$ and $\overline{CV}_4$ from the counter 11 is K, then one carry signal CR is produced whenever 8/K decay clock pulses are supplied. Furthermore, as the data $CV_4$, $CV_5$ and $CV_6$, higher than the third bit, of the coutner 11 are fed back to the fraction part counter 16, the count rate of the fraction part counter 16, namely, the values of the input data $\overline{CV}_6$, $\overline{CV}_5$ and $\overline{CV}_4$ are changed whenever the content of the counter is advanced by eight steps (subtracted by eight).

Accordingly, if it is assumed that the number of decay clock pulses DC necessary for advancing the content of the counter by eight steps is N; then (step number of counter 11) = (subtraction pulse number by pulse *DC*) − (addition pulse number by carry signals *CR*).

Therefore, in general, the following equation is established:

$$8 = N - \left(N/\frac{8}{K}\right) = \frac{8N - KN}{8}$$

In consequence, the following relation is established between N and K:

$$N = \frac{64}{8 - K}$$

Upon application of N pulses DC, the content of the counter 11 is decreased by eight steps. Therefore, the inclination (rate) in subtraction variation of the counter 11 is 8/N which depends on the value K of the data $\overline{CV}_6$, $\overline{CV}_5$ and $\overline{CV}_4$ fed back to the fraction part counter 16. Accordingly, the value of the counter 11 is linearly changed (changed with a constant inclination) for the period of time during which the value K is maintained unchanged; however, the inclination in count value variation of the counter 11 is changed if the value K is changed.

The data $\overline{CV}_6$, $\overline{CV}_5$ and $\overline{CV}_4$ forming the value K, or the data $CV_6$ $CV_5$ and $CV_4$ is of 3-bits, and therefore the value K varies in eight ways. More specifically, as indicated in the following Table 5, the value K in the counter 11 of modulo 64 varies in eight steps, i.e. regions I–VIII. In the left column of Table 5, the ranges of the count values CV of the counter 11 included in the regions I through VIII are indicated by decimal numbers.

TABLE 5

| | CV | $CV_6$ | $CV_5$ | $CV_4$ | $\overline{CV}_6$ | $\overline{CV}_5$ (K) | $\overline{CV}_4$ | $\frac{8}{K}$ | N |
|---|---|---|---|---|---|---|---|---|---|
| | 63 | | | | | | | | |
| I | ↓ 56 55 | 1 | 1 | 1 | 0 | 0 | 0 | 0 | 8 |
| II | ↓ 48 47 | 1 | 1 | 0 | 0 | 0 | 1 | 8 | 9 |
| III | ↓ 40 39 | 1 | 0 | 1 | 0 | 1 | 0 | 4 | 10 |
| Time IV | ↓ 32 31 | 1 | 0 | 0 | 0 | 1 | 1 | $\frac{8}{3}$ | 13 |
| V | ↓ 24 23 | 0 | 1 | 1 | 1 | 0 | 0 | 2 | 16 |

TABLE 5-continued

| | CV | $CV_6$ | $CV_5$ | $CV_4$ | $\overline{CV}_6$ | $\overline{CV}_5$ (K) | $\overline{CV}_4$ | $\frac{8}{K}$ | N |
|---|---|---|---|---|---|---|---|---|---|
| VI | ↓ 16 15 | 0 | 1 | 0 | 1 | 0 | 1 | $\frac{8}{5}$ | 21 |
| VII | ↓ 8 7 | 0 | 0 | 1 | 1 | 1 | 0 | $\frac{8}{6}$ | 13 |
| VIII | ↓ 0 | 0 | 0 | 0 | 1 | 1 | 1 | $\frac{8}{7}$ | 56 |

In Table 5, as was described before, 8/K indicates the number of decay clock pulses DC necessary for producing one carry signal CR in each of the regions I through VIII, and N designates the total number of pulses DC supplied in each of the regions I through VIII. In the last region VIII, the pulse number N is 56 instead of 64 because the count value CV becomes zero with seven steps decreased. Referring to Table 5 and Table 4 described before, it can be understood that the count operation from computation timing 2 to computation timing 11 in Table 4 indicates the operation of region III in Table 5.

As the value K is gradually increased whenever the region is shifted toward VII from I (the value of the feedback data $CV_6$, $CV_5$ and $CV_4$ is gradually decreased as the count value of the counter decreases), the inclination 8/N in count value variation of the counter 11 becomes as the region is shifted toward VIII. Therefore, a decay curve of exponential characteristic as shown in FIG. 10 can be obtained by eight-step polygonal lines in each of the regions I through VIII.

Referring back to FIG. 4, the count value data $CV_1$ through $CV_6$ of the counter 11 are applied to an AND circuit 145 of the count value detection circuit 17 after being inverted by respective inverters. Therefore, when the count value of the counter 11 becomes zero (0) in the last region VIII, the AND circuit 145 produces an output "1", which enables an AND circuit 146 through a delay shift register 147. Whenever the decay clock pulse DC is applied to the AND circuit 146, the latter 146 is operated to apply a signal "1" to the carry signal input terminal of an adder 122 of the fraction part counter 16 through a line 148. When all of the data in the counter 11 are "0", the feedback data $\overline{CV}_6$, $\overline{CV}_5$ and $\overline{CV}_4$ are "1 1 1". Therefore, whenever the decay clock pulse DC is applied to the counter 16, the carry signal CR is produced by the fraction part counter 16, as a result of which "1" is added to the counter 11. While "1 1 1 1 1 1" is added to the counter 11 in response to the decay clock pulse DC at all times, "1" is added thereto by the above-described carry signal CR. Therefore, the count value "0" is maintained in the counter 11.

The above-described computation operations are all carried out in time sharing manner separately for the respective channels. Therefore, the many delay flip-flop circuits not designated by reference numerals are so arranged that the channel times between the computation data in computation circuits are coincident with one another. In addition, in the counter 11 there are some shift registers in which the number of delay stages for signals led therefrom is different. This is also for coincidence of the channel times. For instance, the data of the adders 105 and 106 are deviated by one microsecond from each other by the delay flip-flop circuit 149 interposed therebetween. Therefore, the data $\overline{CV}_5$ is led out with a delay of 9 microseconds by the shift registers 116 and 117, and the data $\overline{CV}_6$ is led out with a delay of 8 microseconds by the shift registers 119 and 120, so that the channel times of the data $\overline{CV}_5$ and $\overline{CV}_6$ are coincident with each other.

Sustain Mode

Figures 11A, 11B, 11C, 11D:
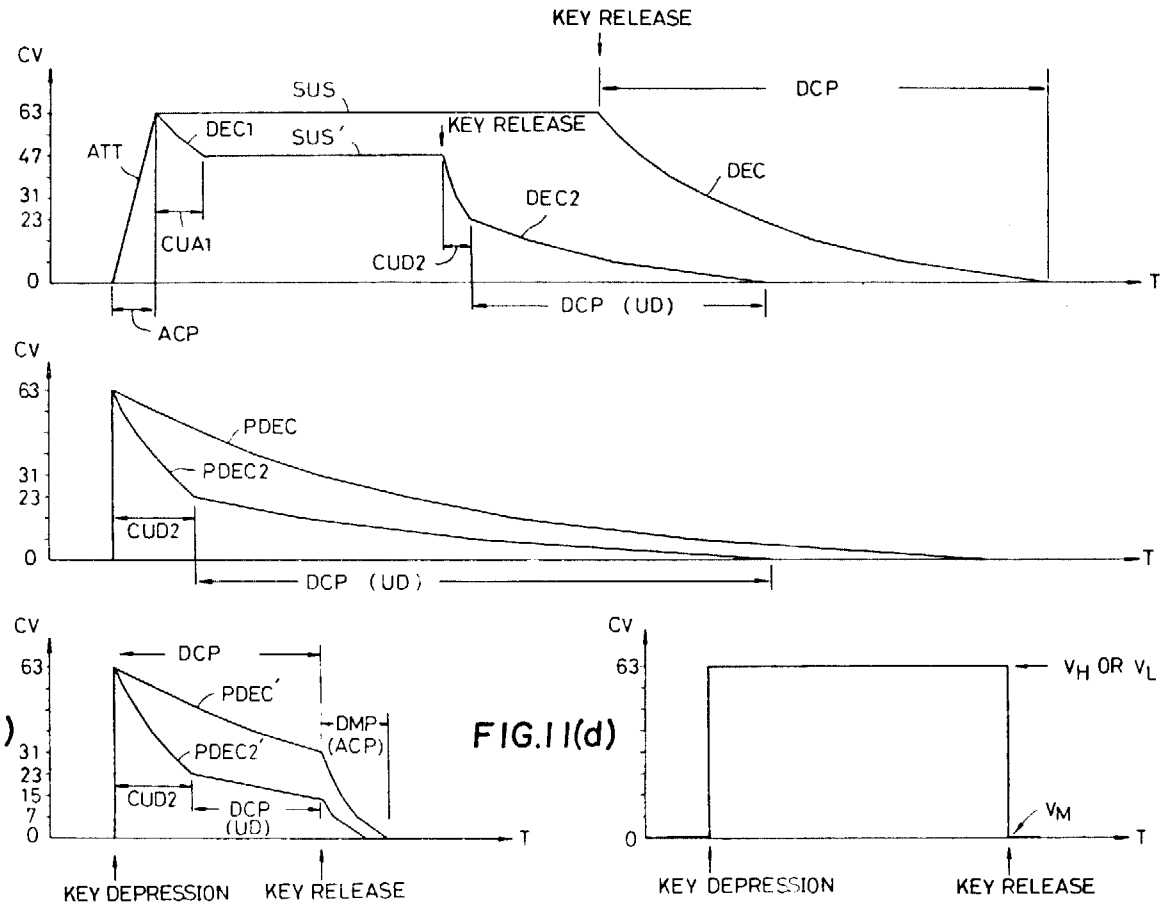
FIG. 11 is a set of graphical representations schematically indicating the variations in count value of the counter in providing various envelope modes, FIG. 11(a) through FIG. 11(d) showing a sustain mode, a percussion mode, a percussive damp mode, and a direct keying mode, respectively, and an ordinary mode and a mode in which a curve selection function is effected being plotted in each of FIG. 11(a) through FIG. 11(c)

FIG. 11(a) is a set of graphs indicating variations of the count value CV of the counter 11 with time T in the case where the sustain mode is selected.

When the sustain mode B is selected, in the envelope generation control ogic 18 in FIG. 3, the AND circuits 54, 55 and 56 are enabled. If the decay start signal DS is not generated yet and the count contents $CV_1$ through $CV_6$ of the counter 11 are not "1", the conditions for the AND circuit 54 are satisfied, and therefore the AND gate 90 in the clock gate 13 is enabled. Upon depression of a key, one of the keyboard signals UE, LE and PE becomes "1", as a result of which the attack clock pulse ACP is supplied to the AND circuit 90 through the OR circuit 88 of the clock select gate 21. Accordingly, upon depression of a key, first of all, the pulse ACP is selected as the attack clock pulse AC by the AND circuit 90, and the pulse thus selected is applied to the addition input of the counter 11, that is, it is applied only to the least significant bit adder 101 through the OR circuit 141 in the counter 11. As a result, the count value CV of the counter 11 is gradually increased from "0" up to "63" at the rate of the attack clock pulse AC.

Thus, the envelope shape of an attack part ATT (FIG. 11(a)) is obtained by addition. The shape of the attack part ATT has a resolution degree of 63 steps corresponding to the modulo of the counter 11.

When the count value CV has reached the maximum value 63, all of the data $CV_1$ through $CV_6$ are "1". Therefore, the data are detected by the AND circuit 150 of the count value detection circuit 17, and the signal "1" is stored in the relevant channel of a shift register 153 through an AND circuit 151 and an OR circuit 152. This storage is self-held through an AND circuit 154. In this connection, it should be noted that the AND circuits 151 and 154 are enabled only when the sustain mode selection signal BE is applied from the OR circuit 53 of the envelope generation control logic 18 through a line 155 and a shift register 156.

When the AND circuit 150 detects that the count value CV is all "1", an all "1" detection signal $AL_1$ is applied to the envelope generation control logic 18 through the OR circuit 152. The detection signal $AL_1$ is stored in the aforementioned shift register 153, and therefore the detection signal $AL_1$ is not eliminated even if the count value CV is changed thereafter.

In the envelope generation control logic 18, if the all "1" detection signal $AL_1$ becomes "1", a signal "0" is applied to the AND circuit 54 through an inverter, as a result of which the AND circuit 90 of the clock gate 13 is made inoperable. Accordingly, the application of the attack clock pulse AC is prohibited. Thus, the counting operation of the counter 11 is suspended, so as to hold a certain count value (63 in this case), whereby the shape of a sustain part SUS (FIG. 11(a)) is obtained.

Upon release of the depressed key, the decay start signal DS is raised to "1" and is applied to the AND circuit 56 of the envelope generation control logic 18 through a line 160. The output "1" of the AND circuit 56 is applied to the AND circuit 91 and 93 of the clock gate 13 through the OR circuit 95. In the case where a curve selection function described later is not selected yet, the output of the OR circuit 97 is "1", and therefore the AND circuit 91 is enabled but the AND circuit 93 is made inoperable. Therefore, the decay clock pulse DCP supplied from the OR circuit 89 of the clock selection gate 21 is selected by the AND circuit 91, and is applied, as the decay clock pulse DC, to the subtraction input of the counter 11 through the OR circuit 98 and the line 100.

As the operation of the counter 11 is suspended at the maximum count value 63, subtraction is carried out from the maximum count value 63 toward the minimum value 0. In this operation, the computation for the polygonal line approximation of exponential characteristic is carried out as was described before, whereby the envelope shape of a decay part DEC exponentially varying as shown in FIG. 10 is obtained.

When the count value of the counter 11 has reached zero (0), an all "0" detection signal $AL_0$ is produced from the AND circuit 145 of the count value detection circuit 17, and is applied to the AND circuit 158 (FIG. 3) through a line 157. To the other input of the AND circuit 158, the decay start signal DS is applied through a line 160 and a shift register 159 for timing control, and the output "1" of the AND circuit 158 is applied, as the decay finish signal DF, to the aforementioned tone production assignment circuit (not shown). Upon generation of the decay finish signal DF, the clear signal CC is provided by the tone production assignment circuit because the generation of the decay finish signal DF means that the tone production in the relevant channel time has been finished. This clear signal CC is applied to the detection circuit 17 in FIG. 4, as a result of which the AND circuits 151 and 154 are made inoperable so as to eliminate the storage of the all "1" detection signal $AL_1$.

Sometimes the electronic musical instrument has a function that, when after release of a key but before completion of the decay the same key is depressed again, the tone for the depressed key is assigned to the same channel (hereinafter referred to as "a key-on-again function" when applicable). In this case, the clear signal CC is produced in that channel once even if no decay finish signal DF is produced. In this case, even during the decay (the count value of the counter being decreased) the all "1" detection signal $AL_1$ is changed to "0", and the attack clock pulse AC is selected instead of the decay clock pulse DC. Accordingly, it is possible to allow the envelope shape to the relevant channel to rise during the decay.

In addition, it is also possible to allow the attack part ATT in the sustain mode to rise extremely steeply. What is considered as one method for achieving this purpose is to employ high speed clock pulses as the attack clock pulses ACP, or the clock signals CA and CPA. In another method considered, the addition by the attack clock signal AC is not carried out in the counter 11, but a counter set signal $S_1$ described later is produced as soon as the attack start signal AS is raised to "1" upon depression of a key, and the count value of the counter 11 is set to "1 1 1 1 1 1" simultaneously, so that the sustain part SUS is obtained without the attack part ATT.

Curve Section in Sustain Mode

The envelope consisting of the parts ATT, SUS and DEC shown in FIG. 11(a) is ordinarily obtained in the sustain mode. If the curve selection function is effected, the envelope is changed into an envelope consisting of parts ATT, DEC1, SUS' and DEC2.

When the curve selection function is effected, the curve section signal CUS becomes "1", and the AND gate 161 in FIG. 3 is enabled. The upper keyboard signal UE is applied to the other input of the AND circuit 161, and therefore the curve selection signal CUS is selected only during the channel time of the upper keyboard tone and is applied to the AND circuit 55 of the envelope generation control logic 18. In other words, in this example, the curve selection function is effected for the upper keyboard tone only.

Similarly as in the ordinary sustain mode, the attack part ATT is realized by applying the pulse ACP as the attack clock pulse AC to the counter 11 thereby to gradually increase the count value of the counter 11 from "0" to "63". When the count value of the counter 11 reaches the maximum value 63, the all "1" detection signal $AL_1$ is produced by the count value detection circuit 17 and is applied to the AND circuit 55 of the envelope generation control logic 18. Under the conditions that the sustain mode B is selected, the curve selection signal CUS is "1", the decay start signal DS is "0", and the count value CV of the counter 11 is not 47 or less (the signal CV47 is "0"), the AND circuit 55 is enabled when the aforementioned signal $AL_1$ becomes "1", so as to apply its output "1" to the AND circuit 92 in the clock gate 13 and to the line 162.

When the AND circuit 92 is thus enabled, the first curve selection clock pulse CUA1 supplied by the clock select gate 21 is selected, and is applied to the subtraction input of the counter 11 through the OR circuit 98 and the line 100. Therefore, in the counter 11 computation is carried out according to the first curve selection clock pulse CUA1, and the count value of the counter 11 is gradually decreased. When the count value data $CV_6$ through $CV_1$ become "1 0 1 1 1 1", the AND circuit 163 in the count value detection circuit 17 is operated to apply its output "1" to the AND circuit 164. Accordingly, when the count value CV of the counter 11 reaches decimal 47, it is detected by the AND circuit 163, and the signal "1" is stored in the shift register 166 through the AND circuit 164 and the OR circuit 165 at the channel time thereof. In this connection, the AND circuit 164 is maintained enabled by the signal CUS' supplied through the line 162 for the period of time when the first curve selection clock pulse CUA1 is selected. The count value "47" detection signal CV47 stored in the shift register 166 is self-held by means of the AND circuit 167, and is inverted by the inverter 168 in the envelope generation control logic 18 thereby to make the aforementioned AND circuit 55 inoperable. As a result, the AND circuit 92 is made inoperable, and therefore the application of the first curve selection clock pulse CUA1 is prohibited.

Thus, the count value CV of the counter 11 is decreased from the maximum value 63 to the value 47, whereby a decay shape, or the first decay part DEC 1 shown in FIG. 11(a), is obtained. This first decay part DEC 1 is obtained by approximation of an exponential characteristic decay shape with two polygonal lines in regions I and II in FIG. 10 or Table 5.

When the count value detection signal CV47 becomes "1", the count operation of the counter 11 is suspended. Therefore, the count value CV of the counter 11 is held at the value 47, and the sustain part SUS' is formed.

Upon release of the key, the decay start signal DS becomes "1". Therefore, the output of the AND circuit 56 of the envelope generation control logic 18 is raised to "1" and is applied to the AND circuits 91 and 93 of the clock gate 13. In this case, as the curve selection signal CUS is "1", the signal applied to the OR circuit 97 through the inverter 169 is "0". Furthermore, when the count value CV of the counter 11 is more than twenty-four (24), the other input of the OR circuit 97 is "0". Therefore, the output of the OR circuit 97 is "0", and the AND circuit 93 is enabled. Accordingly, the second curve selection clock pulse CUD2 is selected by the AND circuit 93, and is applied as the decay clock pulse DC, to the counter 11 and the gate 15 of the fraction part counter 16 through the OR circuit 98 and the line 100.

Thus, upon release of the key, the operation of the counter 11 is started again, whereby the second decay part DEC 2 is formed. With respect to the first half of the second decay part DEC 2, the computation is carried out according to the second curve selection clock pulse CUD2 so that an exponential decay characteristic approximation is effected with three polygonal lines in the aforementioned regions III, IV and V. However, when the computation of region V is completed and the count value CV becomes 23 or less, the decay clock pulse DC is switched from the pulse CUD2 to the pulse DCP.

In the count values of 24 and larger values, i.e., in the count value data $CV_6$ through $CV_1$ from "1 1 1 1 1 1" to "0 1 1 0 0 0", the data $CV_6$ is "1" or the data $CV_5$ and $CV_4$ are "1 1". Therefore, in the count value detection circuit 17, the data $CV_5$ and $CV_4$ are applied to the AND circuit 170 whose output is applied to the OR circuit 171, and the data $CV_6$ is applied to the OR circuit 171 so as to detect that the count value CV is 24 or more. When the count value CV becomes 23 and less, the output of the OR circuit 171 becomes "0" and the output of "0", and the output of the inverter 172 becomes "1". The output "1" of the inverter 172 is applied, as a count-value-23- or -less detection signal CV23, to the OR circuit 97 in FIG. 3. Accordingly, when the count value CV becomes 23 or less, the output of the OR circuit 97 is raised to "1", the AND circuit 93 in the clock gate 13 is made inoperable, and the AND gate 91 is enabled. As a result, the decay clock pulse DCP is selected by the AND gate 91, and is applied to the counter 11 and the gate 15 of the fraction part counter 16. Thus, the computation with respect to regions VI, VII and VIII for the count values of 23 and smaller values is carried out according to the decay clock pulse DCP. The decay clock pulse DCP corresponding to the second curve selection clock pulse CUD2 is the upper keyboard decay clock pulse UD. As was described before, the frequency of the clock pulse UD is ¼ of the frequency of the clock pulse CUD2. Therefore, as is shown in FIG. 11(a), in the second decay part DEC 2 the variations of the parts in regions VI, VII and VIII where polygonal line approximation is carried out according to the clock pulse UD are considerably gradual when compared with those of the parts in regions III, IV and V where polygonal line approximation is carried out according to the second curve selection clock pulse CUD 2.

Percussion Mode

FIG. 11(b) indicates variations with time of the count value CV of the counter 11 where the percussion mode is selected. In FIG. 11(b), a decay curve PDEC having a constant exponential characteristic indicates an ordinary percussion mode, while a decay curve PDEC2 whose exponential characteristic is changed from one to the other indicates a percussion mode where the curve selection function is effected.

At the start of depressing a key, a single attack pulse AP is produced in synchronization with the channel time to which the production of a tone for the depressed key is assigned, and is applied through a line 173 to the AND circuit 57 in the envelope generation control logic 18. In the case where the percussion mode has been selected, the AND circuits 57, 58 and 59 are enabled. Therefore, the attack pulse AP is applied through the AND circuit 57 to the OR circuit 96. Accordingly, in response to the attack pulse AP, the counter set signal $S_1$ of one microsecond in pulse width is outputted by the OR circuit 96. The counter set signal $S_1$ is applied through the line 174 to the counter 11 in FIG. 4 so that all of the count value data $CV_1$ through $CV_6$ of the counter 11 are set to "1". In other words, the signals "1" are stored in the shift registers 107, 109, 111, 113, 116 and 119 through the OR circuits 175 to 180, respectively. Thus, in the initial period of depressing the key, the count value CV of the counter 11 is increased to "63" from "0" at once. During the key depression, the decay start signal DS is "0", and therefore the output of the AND circuit 58 in the envelope generation control logic 18 is raised to "1". This output "1" of the AND circuit 58 is applied through the OR circuit 95 to the AND circuit 91 so as to select the decay clock pulse DCP. Therefore, the counter 11 carries out the exponential chracteristic polygonal line approximation computation, and the count value CV thereof is gradually decreased. Upon release of the key, the AND circuit 59 is operated to allow the AND circuit 91 to continuously select the decay clock pulse DCP. Therefore, irrespective of the key release, the count value of the counter 11 is decreased.

Thus, the decay curve PDEC in the ordinary percussion mode is computed in response to the clock pulse DCP which is constant over regions I through VIII, and is obtained as an envelope having a constant exponential characteristic.

Since the output of the OR circuit 97 (FIG. 3) is "0" with the count value CV being from "63" to "24" when the curve selection signal CUS is set to "1", the AND gate 93 of the clock gate 13 is enabled. Accordingly, in regions I through V where the count value CV is from "63" to "24" the second curve selection clock pulse CUD 2 is applied, as the decay clock pulse DC, to the counter 11 and to the gate 15 of the fraction part counter 16. Therefore, in the case where the curve selection function is effected, the polygonal line approximation computation is carried out according to the second curve selection clock pulse CUD2 for the first half of the decay curve PDEC2, or the polygonal line regions I through V. When the count value CV of the counter 11 becomes 23 less, as was described before, the detection signal CV23 becomes "1", and the AND circuit 91 is enabled by the output "1" of the OR circuit 97. Therefore, the decay clock pulse DC applied to the counter 11 is switched from the second curve selection clock pulse CUD2 to the clock pulse DCP (the upper keyboard clock pulse UD), whereby for regions VI through VIII of the decay curve PDEC2 the polygonal line approximation computation is carried out according to the slow decay clock pulse DCP (UD).

Percussive Damp Mode

In the case where the percussive damp mode is selected, the count value CV of the counter 11 is varied as shown in FIG. 11(c). Reference character PDEC' designates a curve in an ordinary percussive damp mode, and reference character PDEC2' designates a curve obtained when the curve selection function is effected.

In the case where the percussive damp mode C is selected, the AND circuits 57, 58 and 60 in the envelope generation control logic 18 are enabled. Therefore, during the key depression, the count operation of the counter 11 is controlled by the outputs of the AND circuit 57 and 58 similarly as in the case of the above-described percussion mode D.

If the key is released during the tone production, the decay start signal DS on the lint 160 is raised to "1", and in this case the attack start signal AS is "1". Therefore, the conditions for the AND circuit 60 are satisfied. The output "1" of the AND circuit 60 is applied to the AND circuit 94 of the clock gate 13 to select a damp clock pulse DMP. The damp clock pulse DMP thus selected is applied, as the decay clock pulse DC, to the counter 11 and the gate 15 of the fraction part counter 16 through the OR circuit 98 and the line 100. The damp clock pulse DMP is higher in rate than the decay clock pulse DCP employed for an ordinary computation. In this embodiment, a special damp clock pulse generating section is not provided, but the attack clock pulse ACP supplied by the OR circuit 88 is employed as the damp clock pulse DMP.

As will be apparent from the above description, during the depression of key, the decay clock pulse DCP at the low rate is used for the polygonal line approximation computation (excepting the pulse CUD2 being used for the first half of the curve selection), whereas upon release of the key the polygonal line approximation computation is executed according to the damp clock pulse DMP at a high rate. Therefore, after release of the key, the count value CV of the counter 11 is abruptly decreased. However, the count value CV is not decreased to "0" at the time instant when the key is released, but is decreased while approximating the exponential characteristic with polygonal lines.

Generation of Direct Keying Shape by Counter

In the case where the envelope mode selecting signals F1 through F3 specify the direct keying mode A, the AND circuits 49 and 50 in the envelope generation control logic 18 are enabled. During the key depression, the attack start signal AS is "1", and the decay start signal DS is "0". Therefore, the input conditions of the AND circuit 49 are satisfied. The output "1" of the AND circuit 49 is applied, as the counter set signal $S_1$, to the counter 11 through the OR circuit 96. During the key depression, the counter set signal $S_1$ is "1" at all times. Therefore, all of the count value data $CV_1$ through $CV_6$ of the counter 11 are maintained set to "1". When the decay start signal DS is raised to "1" by releasing the key, the AND circuit 50 is operated, and the AND circuit 49 is made inoperable. The output "1" of the AND circuit 50 is introduced, as a count value clear signal $S_0$, to a clear line 139 (FIG. 4) through the line 140, thereby to set to "0" all of the count value data of the counter 11. Accordingly, during the key depression the value of the counter 11 is set to the maximum value 63, but it is cleared to "0" after release of the key. Thus, the envelope in the direct keying mode is obtained as shown in FIG. 11(d).

Memory 12

The count value data $CV_1$ through $CV_6$ of the counter 11 are applied to the memory 12 shown in FIG. 5, and are employed as address inputs for reading amplitude information stored in the memory 12. In this example, the memory 12 is so designed as to convert the count value data $CV_1$ through $CV_6$ into analog voltages corresponding to the values thereof. The memory 12 comprises: AND circuit groups 181 and 182 for decoding the inputted count value data $CV_1$ through $CV_6$ into addresses 0 through 63; resistance type voltage division circuits 183 and 184; and analog gate groups 185 and 186 (indicated by field-effect transistors in FIG. 5) for obtaining voltages from the resistance type voltage division circuits 183 and 184 according to the decoded outputs of the AND circuit group 181 and 182. A high voltage $V_H$(−5 volts for instance) is supplied to a voltage supply line 187 on the address 63 side of the resistance type voltage division circuit 183, while a low voltage $V_L$ (0 volt for instance) is supplied to a voltage supply line 188 on the address 63 side of the resistance type voltage division circuit 184. The voltage supply terminals on the address 0 side of the resistance type voltage division circuits 183 and 184 are connected by a common line 189. Since the voltage division circuits 183 and 184 equal in construction to each other, the voltage $V_M$ is a middle voltage (−2.5 volts for instance) between the high voltage $V_H$ and the low voltage $V_L$. Therefore, the voltage division circuits 183 and 184 serve to divide a voltage (2.5 volts for instance) which is a half of the potential difference between the high voltage $V_H$ and the low voltage $V_L$ into 64 steps for addresses 0 through 63. For eight steps from address 0 to address 7, resistors are arranged so as to obtain exponential voltage division ratios. On the other hand, for fifty-six steps from address 8 to address 63, equal resistors are series-connected so as to obtain equal voltage division ratios. Therefore, the relationships between the values 0 through 63 of the count value data $CV_1$ through $CV_6$ applied as the address inputs and the contents stored in the memory 12 are as indicated by the solid line in FIG. 7.

Accordingly, in the regions I through VII where the count value CV is from 63 to 8, the count value is converted into analog voltage in linear relationship. However, as the variation of the count value CV itself is approximated in exponential relationship with polygonal lines as was described with reference to FIGS. 10 and 11, envelope amplitude information (voltage) having a polygonal-line-like decay exponential characteristic and coincident with the variation of the count value CV (that is, the variation of the address input) is read out of the memory 12. In addition, in the last region VIII where the count value CV is linearly varied from 7 to 0, as the content stored in the memory 12 is exponentially set, envelope amplitude information having an exponential characteristic is automatically read out even if the address input is linearly changed.

As condutive to an understanding of the difference between the variation of the count value CV itself of the counter and the envelope amplitude information read out of the memory 12, an exponential characteristic waveform directly read out of the memory 12 is indicated by the broken line in FIG. 10. By the combination of the exponential approximation with polygonal lines by computation and the analogous exponential approximation by reading an exponential waveform in the last region VIII, a decay envelope having an ideal exponential characteristic which reaches a zero level gently can be obtained.

It goes without saying that the whole addresses of the memory 12 may be set linear. In this case, in the last region VIII also, the envelope amplitude values are read out as the variation of the count value CV indicated by the solid line in FIG. 10.

Figure 12:
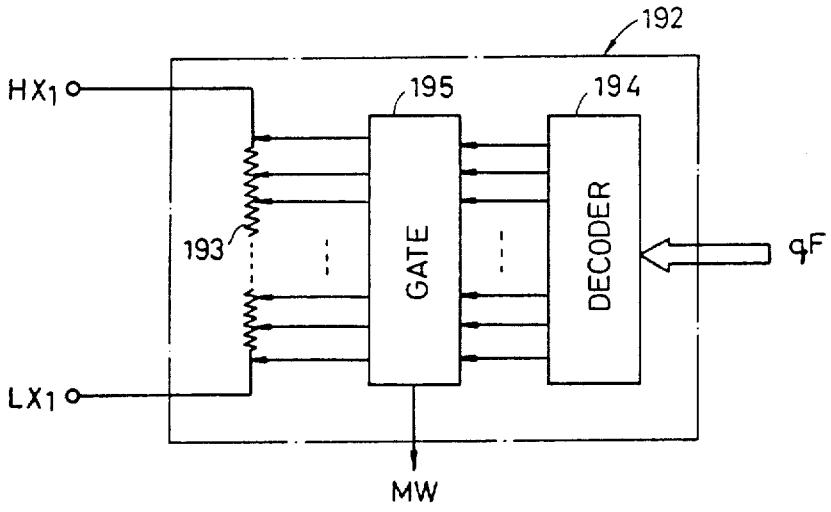
FIG. 12 is a block diagram illustrating one example of a musical tone shape memory in an electronic musical instrument utilizing envelope shapes generated by the envelope generator described above.
Figure 13:
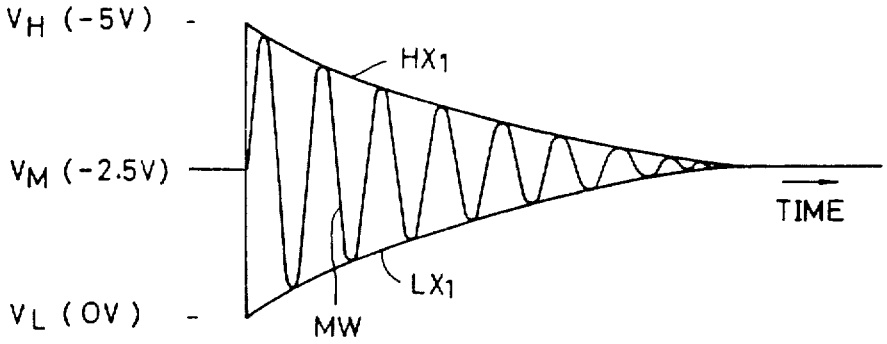
FIG. 13 is a graphical representation schematically indicating a state that an envelope is given to a musical tone signal in the circuit shown in FIG. 12.

The memory 12 shown in FIG. 5 is provided with the two resistance type voltage division circuits 183 and 184 to which voltage are applied in the opposite directions. Therefore, two envelope shapes which vary symmetrically about the middle voltage $V_M$ can be obtained from the output lines 190 and 191 of the analog gate groups 185 and 186, respectively. This is to apply the envelope shapes produced by the groups $X_1$, $X_2$ and $X_3$ to a musical tone waveshape memory formed as a voltage division circuit. For instance, the group $X_1$ receives an envelope shape $HX_1$ through the output line 190, and an envelope shape $LX_1$ through the output line 191. These envelope shapes $HX_1$ and $LX_1$ are applied to both end terminals of a voltage division circuit 193 of a musical tone waveshape memory 192 as shown by way of example in FIG. 12, where the potential difference between the shapes $HX_1$ and $LX_1$ is subjected to voltage division. Data qF which varies periodically according to the frequency of the tone of a key depressed is applied to a decoder 194 of the memory 192. A gate 195 of the memory 192 is controlled by the output of the decoder 194, thereby to obtain the output of the voltage division circuit 193. Therefore, an envelope-controlled musical tone waveshape signal MW as shown in FIG. 13 is read out of the musical tone waveshape memory 192.

However, in the case where an envelope is given to a musical tone waveshape by using a voltage-controlled type amplifier or a multiplication circuit, the envelope information read out of the memory 12 may be of only one shape.

The signal (the upper side envelope shape) on the output line 190 of the memory 12 is applied to analog gates 196, 197 and 198 of the memory output distribution gate 27; while the signal (the lower side envelope shape) on the output line 191 thereof is applied to analog gates 199, 200 and 201 of the memory output distribution gate 27.

Generation of Direct Keying Shape

The direct keying shape selection signals $O_1$, $O_2$ and $O_3$ outputted by the direct keying shape generation system decoder 25 in FIG. 3, the attack start signal AS, and the decay start signal DS are supplied to the direct keying shape generating section 26 (FIG. 5) through a shift register group 202 for timing adjustment.

The direct keying shape generating section 26 comprises: analog gates 203, 204 and 205 for introducing the high voltage $V_H$, as the maximum level envelope amplitude value, to the upper side envelope shape outputs $HX_1$, $HX_2$ and $HX_3$ of the output groups $X_1$, $X_2$ and $H_3$; analog gates 206, 207 and 208 for introducing the middle voltage $V_M$ on the line 189, as the zero level envelope amplitude value, to the upper side envelope shape outputs $HX_1$, $HX_2$ and $HX_3$ of the output groups $X_1$, $X_2$ and $X_3$; analog gates 209, 210 and 211 for introducing the middle voltage $V_M$, as the zero level envelope amplitude value, to the lower side envelope shape outputs $LX_1$, $LX_2$ and $LX_3$ of the output groups $X_1$, $X_2$ and $X_3$; and analog gates 212, 213 and 214 for introducing the low voltage $V_L$, as the maximum level envelope amplitude value, to the lower side envelope shape output $LX_1$, $LX_2$ and $LX_3$.

Where the direct keying shape selecting signals $O_1$, $O_2$ and $O_3$ are in the group of "1", the direct keying shape is produced by the direct keying shape generating section 26. Where the signals $O_1$, $O_2$ and $O_3$ are in the group of "0", an envelope shape read out of the memory 12 through the gate 27 is selected. Therefore, when the signal $O_1$, $O_2$ and $O_3$ are at the "1" level, AND circuits 215, 216, 217, 218, 219 and 220 corresponding to the signals $O_1$, $O_2$ and $O_3$ of the direct keying shape generating section 26 are enabled. As was described before, the direct keying shape selecting signals $O_1$, $O_2$, and $O_3$ are produced only when the keyboard signals UE–PE are produced by depression of a key. In addition, the decay start signal DS is at the "0" level during the key depression, and therefore the output of the inverter 221 is raised to "1", and the AND circuits 215 through 217 are enabled. Accordingly, when one of the signals $O_1$, $O_2$ and $O_3$ is raised to "1" in the combinations indicated in Table 2, the output of one of the AND circuits 215 through 216 corresponding to this signal is raised to "1", and the analog gates 203 and 212, or 204 and 213, or 205 and 214 which correspond to this AND circuit are operated. Thus, the maximum level voltages $V_H$ and $V_L$ are applied to the upper side envelope shape outputs $HX_1$–$HX_3$ and the lower side envelope shape outputs $LX_1$–$LX_3$ in the groups $X_1$–$X_3$ where the signal $O_1$–$O_3$ are "1", respectively. The supply of the aforementioned maximum level voltages $H_V$ and $L_V$ is continued until, upon release of the key, the decay start signal DS is raised to "1" and the AND circuits 215 through 217 are made operable. When the decay start signal DS is raised to "1", the AND circuits 218 through 220 are operated, and the analog gates 206 through 208 and 209 through 211 are operated through the OR circuit 222 through 224. As a result, the middle voltage $V_M$ is applied, as the "0" level voltage of the envelope shape, to the outputs $HX_1$ through $LX_3$. Thus, the envelope shape in the direct keying mode as shown in FIG. 11(d) is obtained.

The analog gates 196 through 201 of the memory output distribution gate 27 are controlled by the outputs of NOR circuits 225, 226 and 227. When the attack start signal AS is raised to "1" by depressing a key, the output of an inverter 228 becomes "0" to enable the NOR circuits 225 through 227. The direct keying shape selecting signals $O_1$, $O_2$ and $O_3$ are applied to the other inputs of the NOR circuits 225 through 227. When the signals $O_1$ through $O_3$ are "0", the outputs of the NOR circuits 225 through 227 are raised to "1". By the outputs "1" of the NOR circuits 225 through 227, the respective analog gates 196 and 199, or 197 and 200, or 198 and 201 are operated, thereby to introduce the envelope shape signals supplied through the outptu lines 190 and 191, as the upper side envelope shape output $HX_1$, $HX_2$ or $HX_3$ and the lower side envelope shape output $LX_1$, $LX_2$ or $LX_3$, respectively.

For instance, in the case of Envelope Function No. 1 in Table 2, the signals $O_1$, $O_2$ and $O_3$ are "0 0 1". Therefore, the analog gates 205 and 214 of the direct keying shape generating section 26 are operated, and therefore the envelope shape in the direct keying mode is introduced to the upper side envelope shape output $HX_3$ and the lower side envelope shape output $LX_3$ of the group $X_3$. On the other hand, in the memory output distribution gate 27, the analog gates 196, 197, 199 and 200 of the groups $X_1$ and $X_2$ are operated, so as to introduce the output of the memory 12, that is, the envelope shape in the sustain mode B in this case to the upper side envelope shape output $HX_1$ and $HX_2$ and the lower side envelope shape outputs $LX_1$ and $LX_2$.

As is apparent from the above description, the envelope shape produced by the system of the counter 11 and the memory 12 and the direct keying shape produced by the direct keying shape generating section 26 are distributed to the groups $X_1$, $X_2$ and $X_3$.

Upon elimination of the tone production assignment, the attack start signal AS produced for the relevant channel time becomes "0". As a result, the output "1" of the inverter 228 operates the analog gates 206 through 211 through the OR circuits 222, 223 and 224. Therefore, the middle voltage $V_M$ representing the "0" level is introduced to the upper side envelope shape outputs $HX_1$ through $HX_3$ and the lower side envelope shape outputs $LX_1$ through $LX_3$ of the groups $X_1$ through $X_3$, and the output level of the envelope generator 10 is positively held at the level "0". That is, no envelope is produced.

In the above-described embodiment, the memory 12 is so designed as to produce analog voltages: however, it may be so designed as to read out digital envelope amplitude information. Furthermore, a digital-to-analog conversion circuit may be employed as the memory 12.

As is apparent from the above description, according to this invention, envelope shapes are produced by computation. Thereore, the step number of amplitude variations forming an envelope can be increased to an unlimited extent by combination of addition and subtraction operations of the counter. Accordingly, it is possible to generate envelope shapes in a variety of modes. In addition, all that is necessary for the content stored in the memory adapted to store the envelope amplitude levels is to linearly correspond to the count values of the counter. Therefore, setting the content of the memory can be readily achieved, which leads to the simplification of the construction of the memory. While the step number can be increased to an unlimited extent by computation, the storage capacity of the memory may be equal to the number of modulo. This is considerably economical. Furthermore, an envelope having an exponential characteristic can be readily obtained by polygonal line approximation computation. In addition, by setting a small part of the storage in the memory to an exponential characteristic, an envelope shape having a fine exponential characteristic which cannot be obtained by polygonal line approximation computation only can be obtained by the device which is simpler in construction than the conventional one.

What is claimed is:

1. An envelope generator comprising:

(a) a count circuit whose count value is varied by addition or subtraction or combination thereof; and (b) a conversion circuit for converting the count value of said count circuit into amplitude data corresponding to said count value, so as to generate an envelope having a shape corresponding to variations with time of said count value, and in which;

said count circuit carries out a first computation wherein said count value is subjected to one arithmetic operation selected from addition and subtraction for every predetermined regular time interval, and a second computation in which said count value is subjected to the opposite arithmetic operation with a prescribed timing that does not occur at every one of said predetermined intervals, said combined first and second computation together exponentially varying said count value by polygonal line approximation, so that an envelope having an exponential characteristic is formed by polygonal line approximation computation.

2. An envelope generator as claimed in claim 1, in which said conversion circuit is a memory circuit which has amplitude data corresponding to count values stored in advance so as to convert count values in the last linear region obtained by said polygonal line approximation computation into amplitude data having exponential relation to said count values and to convert count values contained in the remaining polygonal line regions into amplitude data having linear relation to said count values.

3. An envelope waveshape generator comprising:

a source of clock pulses occurring at a certain rate, a digital counter connected to be stepped by said clock pulses, feedback computation means, cooperating with said counter, for modifying the rate at which said counter is stepped by said clock pulses in response to the accrued contents of said counter so as to achieve a certain relationship of accrued count as a function of time, and conversion means for converting each accrued count to a corresponding amplitude value, the resultant amplitude values comprising an analog envelope waveshape, said conversion means comprising:

a memory circuit having digitally addressable storage locations corresponding to each accrued count of said counter, each storage location including a circuit network for producing an analog amplitude value corresponding to the digital address value of that storage location, said memory circuit being accessed by the contents of said counter.

4. An envelope waveshape generator according to claim 3 wherein for the subset of lowest valued storage locations said amplitude values are non-linearly related to said storage location address values, and wherein for higher valued storage locations said amplitude values correspond to said address values.

5. An envelope waveshape generator comprising:

a source of clock pulses occurring at a certain rate, a digital counter connected to be stepped by said clock pulses, and adapted to be incremented or decremented or both incremented and decremented upon occurrence of each clock pulse, and feedback computation means, cooperating with said counter, for modifying the rate at which said counter is stepped by said clock pulses in response to the accrued contents of said counter so as to achieve a certain relationship of accrued count as a function of time, said feedback computation means controlling whether said counter is incremented, decremented or both incremented and decremented upon occurrence of each clock pulse.

6. An envelope waveshape generator according to claim 5 wherein:

said counter has plural bit positions, said accrued count being the contents of a set of high order bit positions of said counter, said feedback computation means comprising certain low order bit positions of said counter not included in said set, together with means for modifying the contents of said low order bit positions in response to the contents of a subset of said high order bit positions, said counter being decremented upon occurrence of each clock pulse and also being incrementd in the event that the modified contents of said low order bit positions results in production of a carry to said set of high order bit positions.

7. An envelope generator for use in an electronic musical instrument, comprising:

a source of "decrement" clock pulses, a multi-bit parallel digital counter having a fraction part and an integer part, said integer part being incremented by a carry from said fraction part, said integer part being decremented upon occurrence of each "decrement" clock pulse unless concurrently incremented by a carry, and feedback means for combining, upon occurrence of each "decrement" clock pulse, a digital value corresponding to the contents of a subset of high order bit positions of said counter integer part with the previous contents of said fraction part, whereby the contents of said integer part will represent a polygonal line approximation of an exponential waveshape.

8. An envelope generator according to claim 7 wherein said feedback means comprises:

a set of inverters for inverting the contents of said subset of high order bit positions, a set of gates enabled by said "decrement" clock pulses, and a set of adders cooperatively connected to said inverters, to said gates and to said counter fraction part and operable, when said gates are enabled, to add said inverted contents of said subset to the prior contents of said fraction part.

9. An envelope generator according to claim 7 together with:

a memory having a set of storage locations corresponding in number and address to all possible values of the contents of said counter integer part, each storage location being accessed when the contents of said counter integer part corresponds to the address of that storage location, each storage location having a circuit network for producing an analog signal having an amplitude corresponding to the address value of that storage location, whereby the analog output produced by said memory will correspond to said polygonal line approximation.

10. An envelope generator according to claim 9 wherein in said memory:

for the storage locations having addresses corresponding to the lowest possible values of said integer part contents, said circuit networks produce analog signals exponentially related to said lowest possible values, and for all other storage locations said circuit networks prouce analog signals linearly related to the corresponding integer part content values.

11. An envelope generator according to claim 9 further comprising:

a source of "increment" clock pulses, said counter integer part being incremented upon input thereto of an "increment" clock pulse instead of a "decrement" clock pulse, and envelope generation control logic, cooperating with said counter, said feedback means and said sources of "decrement" and "increment" clock pulses, for programmatically selectively applying either said "increment" or said "decrement" clock pulses to said counter and for correspondingly disabling or enabling said feedback means so as to cause said memory output to represent an envelope having both an attack portion of increasing amplitude and a decay portion of decreasing amplitude.

12. An envelope generator according to claim 11 for use with a keyboard electronic musical instrument, wherein:

said "decrement" clock source provides "decrement" clock pulses at a selectable one of a plurality of clock rates, and wherein said envelope generation control logic selectively applies to said counter said "increment" clock pulses and said "decrement" clock pulses at selected clock rates in response to the depressed and released conditions of a keyboard key, said selective application being programmable to obtain envelopes of different waveshape.

13. An envelope generator for a keyboard electronic musical instrument comprising:

a counter respectively incremented or decremented by the application thereto of an "increment" clock pulse or a "decrement" clock pulse, said counter having an integer part and a fraction part, feedback computation means for combining a value established by the contents of a portion of said counter integer part with the previous contents of said fraction part, a carry from said fraction part incrementing said integer part, analog conversion means for providing an output signal having an amplitude corresponding to the contents of said counter integer part, and envelope generation control logic means, cooperating with said counter, said computation means and the keyboard of said instrument, for selectively controlling the application of either "increment" or "decrement" clock pulses to said counter and for selectively enabling or disabling said analog conversion means in response to the depressed and released conditions of a keyboard key, whereby said output signal will represent a musical envelope of selectable shape.

14. An envelope generator according to claim 13 wherein said envelope generation control logic means selectively alters the rate of said applied "decrement" clock pulses when the contents of said counter integer part reach a certain value.

*15. An envelope generator used in an electronic musical instrument for generating in real time an envelope waveshape signal which is used to impart a characteristic varying with time to a musical tone produced by said instrument, the value of said envelope waveshape signal that is being generated at each present time being designated the current value, comprising:*

*first register means for storing the current value of said envelope waveshape signal,*

*arithmetic means, receiving waveshape variation data, for arithmetically combining the waveshape variation data with at least a part of said stored envelope waveshape signal, the resultant new current value envelope waveshape signal being stored in said register means in place of the value previously stored therein, upon each such combining operation of said arithmetic means,*

*control means for producing the variation data and for programmatically altering the arithmetic operations of said arithmetic means each in accordance with different parts of a selected waveshape, said different parts including attack, decay and release, and*

*feedback means for feeding back at least a part of the stored current value envelope waveshape signal from said register means to said control means so that said alteration of arithmetic operations and said production of said variation data by the control means are controlled both in response to said fed back part and with respect to the different attack, decay and release parts of such selected waveshape, the envelope waveshape signal thereby being altered programmatically to obtain a preselected time variation thereof corresponding to said selected envelope waveshape said register means thereby storing said envelope waveshape signal during attack, decay and release parts of said envelope, the stored current value thereof being changeable by cooperation of said control means and said feedback means during all of said parts of said selected waveshape.*

*16. An envelope generator used in an electronic musical instrument for generating in real time an envelope waveshape signal which is used to impart a characteristic varying with time to a musical tone produced by said instrument, the value of said envelope waveshape signal that is being generated at each present time being designated the current value, comprising:*

*first register means for storing envelope waveshape data corresponding to the current value of said envelope waveshape signal,*

*adder means, receiving waveshape variation data, for arithmetically combining the waveshape variation data with at least a part of said stored envelope waveshape data, the resultant new current value envelope waveshape data being stored in said register means in place of the data previously stored therein,*

*control means for producing the variation rate data and for programmatically altering the arithmetic operations of said adder means each in accordance with different parts of a selected waveshape, and*

*feedback means for feeding back at least a part of the current value envelope waveshape data from said register means to said control means so that said alteration of arithmetic operations and said production of said variation rate data by the control means are controlled both in response to said fed back part and with respect to the different parts of such selected waveshape, the envelope waveshape data thereby being altered programmatically to obtain a preselected time variation thereof corresponding to said selected envelope waveshape, and wherein said control means further comprises:*

*second register means, controlled in accordance with said resultant data from said adder means, for storing second data designating either of ascending and descending characteristics of the envelope waveshape, and wherein said feedback means comprises a first feedback circuit for feeding back at least a portion of the stored contents of said first register means to said control means thereby controlling said variation data in its value, and a second feedback circuit for feeding back said second data to said control means thereby controlling the variation data in its polarity.*

*17. In an electronic musical instrument of the type in which a musical tone waveshape memory is repetitively accessed by access data which periodically varies according to the frequency of a selected tone, the improvement comprising:*

*an envelope generator operative to generate an envelope having attack, decay and release portions, said generator having:*

*a counter, the contents of said counter constituting the current value of the envelope amplitude during all portions of the generated envelope,*

*arithmetic operation means, connected in a loop with said counter, for selectively arithmetically modifying the contents of said counter upon occurrence of a clock pulse of a selected frequency,*

*feedback means, cooperating with said arithmetic operation means, for modifying the effective rate at which said counter contents change upon occurrence of said clock pulses in response to the accrued contents of said counter reaching certain values so as to achieve a certain stepwise relationship of accrued count value as a function of time,*

*pulse rate selection means for selectively controlling the frequency of said clock pulses during different portions of said envelope, and*

*weighting conversion means for utilizing each accrued count value to impart stepwise a directly corresponding amplitude value to the tone waveshape accessed from said musical tone waveshape memory.*

*18. An electronic musical instrument according to claim 17 wherein said feedback means cooperates with said arithmetic operation means to vary the net change in accrued count value per unit time during certain different portions of the generated envelope, in response to the accrued count reaching certain values.*

*19. An envelope waveshape generator comprising:*

*a source of clock pulses occurring at a certain frequency,*

*a digital counter connected to be stepped upon occurrence of said clock pulses,*

*feedback computation means, cooperating with said counter, for modifying the effective rate at which the contents of said counter is stepped in response to the accrued contents of said counter reaching certain values so as to achieve a certain relationship of accrued count as a function of time,*

*a memory storing at least part of a musical tone waveshape, and means for accessing said memory repetitively with access data that varies progressively according to the frequency of a selected tone,*

*envelope imparting means for imparting to the tone waveshape accessed from said memory an envelope having an amplitude equivalent in value to said accrued count as a function of time, said envelope having attack, decay and release portions, and*

*clock pulse frequency selection means for selectively controlling the frequency of said clock pulses during different portions of said imparted envelope.*

* * * * *